(12) United States Patent
Belenky et al.

(10) Patent No.: US 12,244,685 B2
(45) Date of Patent: Mar. 4, 2025

(54) CARRY-BASED DIFFERENTIAL POWER ANALYSIS AND ITS APPLICATION TO TESTING FOR VULNERABILITY OF SHA-2 AND HMAC-SHA-2 TO SIDE CHANNEL ATTACK

(71) Applicant: FortifyIQ, Inc., Newton, MA (US)

(72) Inventors: Yaacov Belenky, Maale Adumim (IL); Ury Kreimer, Tekoa (IL); Alexander Kesler, Newton, MA (US)

(73) Assignee: FORTIFYIQ, INC., Newton, MA (US)

( * ) Notice: Subject to any disclaimer, the term of this patent is extended or adjusted under 35 U.S.C. 154(b) by 210 days.

(21) Appl. No.: 18/173,569

(22) Filed: Feb. 23, 2023

(65) Prior Publication Data

US 2023/0269065 A1    Aug. 24, 2023

Related U.S. Application Data

(60) Provisional application No. 63/268,482, filed on Feb. 24, 2022.

(51) Int. Cl.
*H04L 9/00* (2022.01)
*G06F 21/57* (2013.01)

(52) U.S. Cl.
CPC ............ *H04L 9/002* (2013.01); *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 10,454,674 B1* | 10/2019 | Bar-El | H04L 63/123 |
| 2009/0010424 A1 | 1/2009 | Qi et al. | |
| 2013/0173928 A1 | 7/2013 | Kocher et al. | |
| 2015/0134973 A1* | 5/2015 | Maytal | G06F 21/755 |
| | | | 713/190 |
| 2015/0222421 A1 | 8/2015 | Guo et al. | |
| 2015/0365228 A1 | 12/2015 | Belenky | |

(Continued)

OTHER PUBLICATIONS

Belaid, Sonia, et al. "Differential power analysis of HMAC SHA-2 in the Hamming weight model." 2013 International Conference on Security and Cryptography (SECRYPT). IEEE, 2013, 13 pages.

(Continued)

*Primary Examiner* — Bradley W Holder
(74) *Attorney, Agent, or Firm* — Brake Hughes Bellermann LLP

(57) ABSTRACT

In a general aspect, a method for testing vulnerability of a cryptographic function (CF) to a side-channel attack includes providing a plurality of input values to the function, where the CF, for each input value calculates a sum of the input value and a first value of the CF, and replaces a second value of the CF with the sum. The method further includes measuring a set of samples including a respective side-channel leakage sample for each input value. The method also includes iteratively performing a series of operations including splitting the set of samples into a plurality of subsets based on the input values, calculating a respective value for each subset based on samples of the subset, and comparing the respective values for different subsets to discover respective bit values of the first value and the second value from their least significant bits to most significant bits.

22 Claims, 10 Drawing Sheets

(56) References Cited

U.S. PATENT DOCUMENTS

| | | | |
|---|---|---|---|
| 2018/0069693 A1* | 3/2018 | Boivie | H04L 9/3242 |
| 2019/0318130 A1* | 10/2019 | Ghosh | H04L 9/003 |
| 2022/0414227 A1 | 12/2022 | Belenky et al. | |

OTHER PUBLICATIONS

Gebotys, Catherine H., Brian A. White, and Edgar Mateos. "Preaveraging and carry propagate approaches to side-channel analysis of HMAC-SHA256." ACM Transactions on Embedded Computing Systems (TECS) 15.1 (2016): pp. 1-19.

McEvoy, Robert, et al. "Differential power analysis of HMAC based on SHA-2, and countermeasures." International Workshop on Information Security Applications. Springer, Berlin, Heidelberg, 2007, 16 pages.

International Search Report and Written Opinion for PCT Application No. PCT/US2023/063152, mailed on Jul. 27, 2023, 12 pages.

Iokibe, Kengo, et al., "A Study on Evaluation Board Requirements for Assessing Vulnerability of Cryptographic Modules to Side-Channel Attacks", IEEE, 2020, pp. 528-531.

* cited by examiner

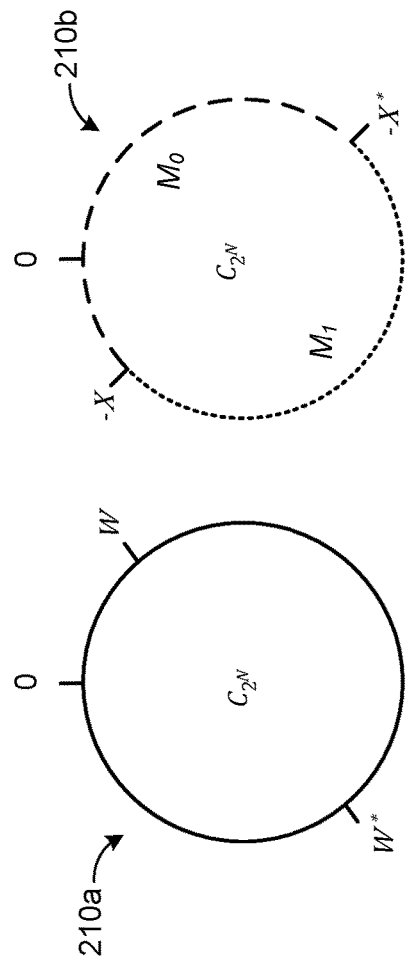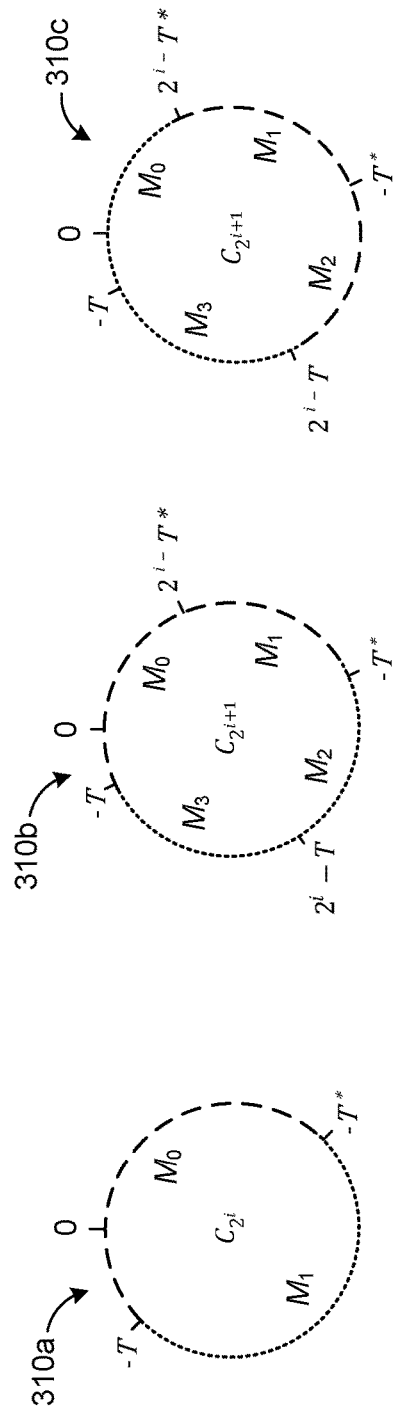
FIG. 2A  FIG. 2B
FIG. 3A  FIG. 3B  FIG. 3C

CARRY-BASED DIFFERENTIAL POWER ANALYSIS AND ITS APPLICATION TO TESTING FOR VULNERABILITY OF SHA-2 AND HMAC-SHA-2 TO SIDE CHANNEL ATTACK

CROSS-REFERENCE TO RELATED APPLICATION

This application claims the benefit of U.S. Provisional Application No. 63/268,482, filed on Feb. 24, 2022, which is hereby incorporated by reference in its entirety.

TECHNICAL FIELD

This description relates to side-channel attacks on cryptographic algorithms and, more specifically, to side-channel attacks on implementations of Secure Hash Algorithm 2 (SHA-2) cryptographic hash function implementations, as well as attacks on hash-based message authentication code (HMAC) implementations that utilize, e.g., SHA-2 hash function implementations.

BACKGROUND

Side-channel attacks can pose a threat to cryptographic algorithms and, more specifically, data and/or information that is sought to be protected using such cryptographic algorithms. As an example, hash functions (hash algorithms), such as hash functions of the Secure Hash Algorithm 2 (SHA-2) family, e.g., if at least some of the inputs to the hash function are secret, may be an interesting target for an attacker (e.g., bad actor, adversary, etc.) seeking to obtain such protected information.

Hash based message authentication code (HMAC) implementations (e.g., hardware and/or software), where the inputs are at least partially secret, are widely used for symmetric message authentication. HMAC approaches that are implemented using hash functions, such as SHA-2 hash functions can, therefore, be a target of bad actors seeking to discover protected information. However, due to the construction of HMAC implementations, current side-channel attacks are not capable of directly mounting a successful side-channel attack on HMAC approaches implemented using SHA-2 family hash function implementations, e.g., without access to an open implementation of a corresponding SHA-2 hash function primitive for use in constructing a template table. Accordingly, it follows that is it is not possible to determine susceptibility (e.g., to test for vulnerability) of a direct side-channel attack on a SHA-2 implementation, or a direct side-channel attack on a SHA-2 primitive (inner hash or outer hash) of an HMAC-SHA-2 implementation.

SUMMARY

In a general aspect a method for testing for vulnerability of a cryptographic function to a side-channel attack includes providing a plurality of input values to the cryptographic function. The cryptographic function, for each input value of the plurality of input values: calculates a sum of the input value and a first value of the cryptographic function, and replaces a second value of the cryptographic function with the sum. The method further includes measuring a set of samples including, for each input value of the plurality of input values, a respective side-channel leakage sample. The method also includes iteratively performing a series of operations including splitting the set of samples into a plurality of subsets based on the plurality of input values; for each subset of the plurality of subsets, calculating a respective value based on samples of the subset; and comparing the respective values for different subsets to discover bit values of the first value and bit values of the second value. The bit values of the first value and the bit values of the second value are discovered from respective least significant bits (LSBs) to respective most significant bits (MSBs).

Implementations can include one or more of the following features, alone or in combination. For example, the method can include respectively comparing the discovered bit values of the first value and the discovered bit values of the second value to the first value and the second value to determine if the discovered bit values of the first value and the discovered bit values of the second value are correct.

Each iteration of the series of operations can discover one or more bit values of the first value and one or more bit values of the second value.

Splitting the set of samples in the plurality of subsets can be further based on previously discovered bit values of the first value and the second value.

The respective values for the different subsets can be respective averages.

The cryptographic function can be implemented in hardware.

In another general aspect, a method for testing for vulnerability of a cryptographic function to a side-channel attack includes providing a plurality of input values to the cryptographic function. The cryptographic function, for each input value of the plurality of input values, calculates a first sum, the first sum being a sum of the input value and a first value of the cryptographic function; calculates a second sum, the second sum being a sum of the input value and a second value of the cryptographic function; replaces a third value of the cryptographic function with the first sum; and replaces a fourth value of the cryptographic function with the second sum. The method further includes measuring a set of traces including, for each input value of the plurality of input values, a respective side-channel leakage trace. The method also includes iteratively performing a series of operations. Each operation in the series of operations includes splitting the set of traces into a plurality of subsets based on the plurality of input values; for each subset of the plurality of subsets, calculating a respective value based on traces of the subset; and comparing the respective values for different subsets to discover bit values of the first value and bit values of the second value. The series of operations discovers the bit values of the first value and the bit values of the second value from respective least significant bits (LSBs) to respective most significant bits (MSBs). The method further includes respectively comparing the discovered bit values for the first value and the second value to the first value and the second value to determine if the discovered bit values of the first value and the discovered bit values of the second value are correct.

Implementations can include one or more of the following features, alone or in combination. For example, each iteration of the series of operations can result in one no bit values being discovered, or one or more bit values of the first value and one or more bit values of the second value being discovered.

Splitting the set of traces in the plurality of subsets can be further based on previously discovered bit values of the first value and the second value.

The respective values for the different subsets can be respective averages.

The cryptographic function can be implemented in hardware.

The cryptographic function can be a secure hash algorithm 2 (SHA-2) hash function.

The cryptographic function can be a hash-based message authentication code (HMAC) function.

Each respective side-channel leakage trace can include a plurality of side-channel leakage samples.

The plurality of side-channel leakage samples includes at least one of a plurality of side-channel leakage samples corresponding with a same clock cycle of the cryptographic function, or a plurality of side-channel leakage samples corresponding with different clock cycles of the cryptographic function.

The plurality of subsets can be a first plurality of subsets and the series of operations can be a first series of operations. The method can include, if the discovered bit values of the first value and the discovered bit values of the second value are determined to be correct, iteratively performing a second series of operations to discover a set of hypotheses for the third value and the fourth value. Each operation in the second series of operations can include, for each hypothesis of the set of hypotheses, splitting the set of traces into a second plurality of subsets based on the plurality of input values; for each subset of the second plurality of subsets, calculating a respective value based on traces in the subset; and comparing the respective values for different subsets of the second plurality of subsets to expand the hypothesis by discovering bit values of the third value and bit values of the fourth value. The second series of operations can discover the bit values of the third value and the bit values of the fourth value from respective least significant bits (LSBs) to respective most significant bits (MSBs). The method can include, for at least one expanded hypothesis, respectively comparing the discovered bit values for the third value and discovered bit values for the fourth value to the third value and the fourth value to determine if the discovered bit values of the third value and the discovered bit values of the fourth value are correct. Expanding the hypothesis can include increasing a number of hypotheses of the set of hypotheses. The cryptographic function can be a secure hash algorithm 2 (SHA-2) hash function. The cryptographic function is a hash-based message authentication code (HMAC) function.

In another general aspect, a non-transitory computer readable medium has instructions thereon. The instructions, when executed by one or more processors cause the one or more processors to provide a plurality of input values to a cryptographic function. The cryptographic function, for each input value of the plurality of input values, calculates a sum of the input value and a first value of the cryptographic function, and replaces a second value of the cryptographic function with the sum. The instructions, when executed, further cause the one or more processors to measure a set of samples including, for each input value of the plurality of input values, a respective side-channel leakage sample. The instructions, when executed, further cause the one or more processors to iteratively perform a series of operations including splitting the set of samples into a plurality of subsets based on the plurality of input values; for each subset of the plurality of subsets, calculating a respective value based on samples of the subset; and comparing the respective values for different subsets to discover bit values of the first value and bit values of the second value. The bit values of the first value and the bit values of the second value are discovered from respective least significant bits (LSBs) to respective most significant bits (MSBs).

In another general aspect, a non-transitory computer readable medium has instructions thereon. The instructions, when executed by one or more processors cause the one or more processors to provide a plurality of input values to a cryptographic function. The cryptographic function, for each input value of the plurality of input values, calculates a first sum, the first sum being a sum of the input value and a first value of the cryptographic function; calculates a second sum, the second sum being a sum of the input value and a second value of the cryptographic function; replaces a third value of the cryptographic function with the first sum; and replaces a fourth value of the cryptographic function with the second sum. The instructions, when executed, further cause the one or more processors to measure a set of traces including, for each input value of the plurality of input values, a respective side-channel leakage trace. The instructions, when executed, further cause the one or more processors to iteratively perform a series of operations. Each operation in the series of operations includes splitting the set of traces into a plurality of subsets based on the plurality of input values; for each subset of the plurality of subsets, calculating a respective value based on traces of the subset; and comparing the respective values for different subsets to discover bit values of the first value and bit values of the second value. The series of operations discovers the bit values of the first value and the bit values of the second value from respective least significant bits (LSBs) to respective most significant bits (MSBs). The instructions, when executed, further cause the one or more processors to respectively compare the discovered bit values for the first value and the second value to the first value and the second value to determine if the discovered bit values of the first value and the discovered bit values of the second value are correct.

Implementations can include one or more of the following aspects, alone or in combination, For example, the plurality of subsets can be a first plurality of subsets and the series of operations can be a first series of operations. The instructions, when executed by the one or more processors, can cause the one or more processors to, if the discovered bit values of the first value and the discovered bit values of the second value are determined to be correct, iteratively perform a second series of operations to discover a set of hypotheses for the third value and the fourth value. Each operation in the second series of operations can include, for each hypothesis of the set of hypotheses, splitting the set of traces into a second plurality of subsets based on the plurality of input values; for each subset of the second plurality of subsets, calculating a respective value based on traces in the subset; and comparing the respective values for different subsets of the second plurality of subsets to expand the hypothesis by discovering bit values of the third value and bit values of the fourth value. The second series of operations can discover the bit values of the third value and the bit values of the fourth value from respective least significant bits (LSBs) to respective most significant bits (MSBs). The instructions, when executed, can cause the one or more processors to, for at least one expanded hypothesis, respectively compare the discovered bit values for the third value and discovered bit values for the fourth value to the third value and the fourth value to determine if the discovered bit values of the third value and the discovered bit values of the fourth value are correct.

BRIEF DESCRIPTION OF THE DRAWINGS

FIGS. 2A and 2B are diagrams illustrating example cyclic additive groups.

FIGS. 3A-3C are diagrams illustrating example cyclic additive groups.

Figure 1:
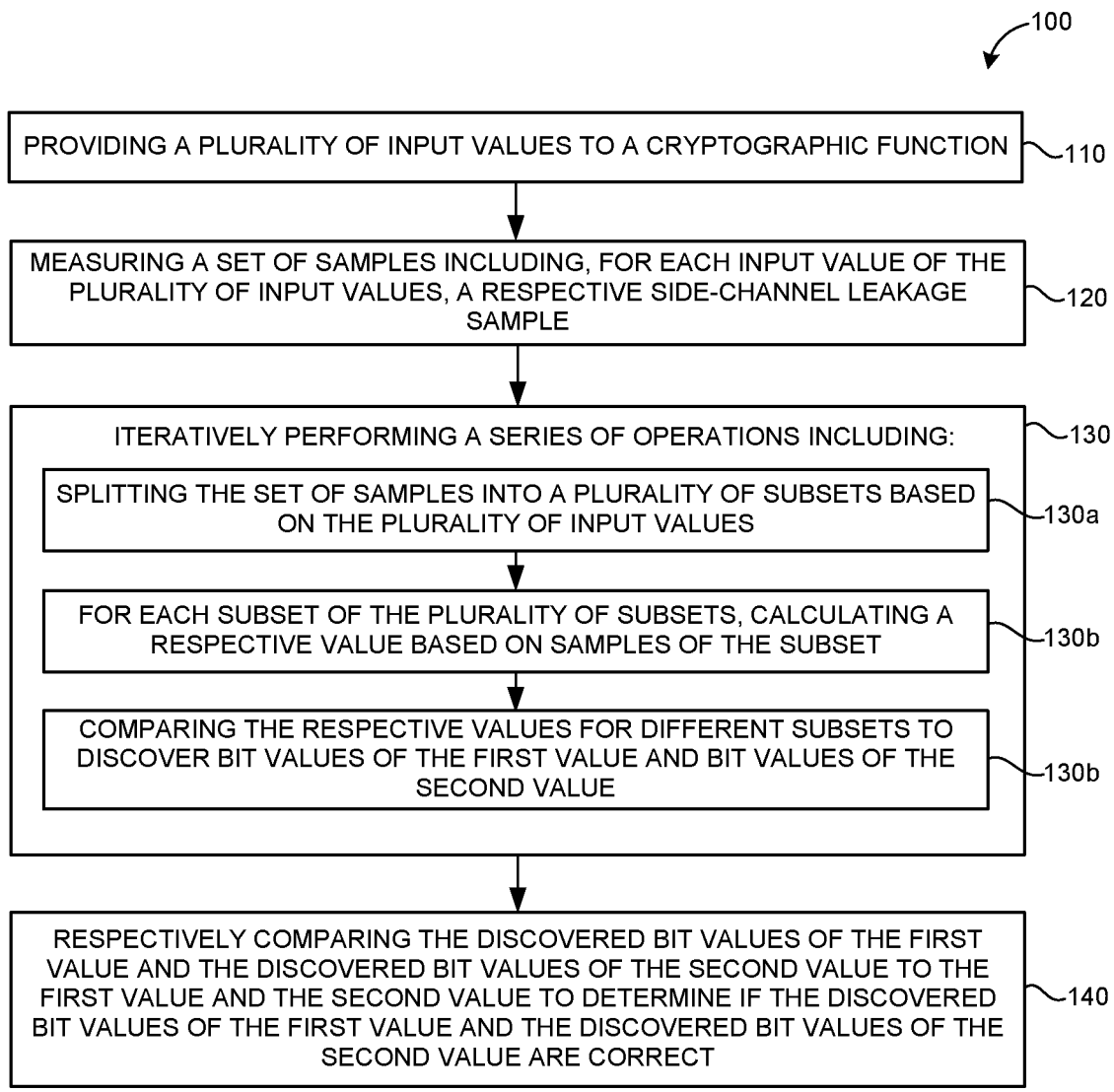
FIG. 1 is a flowchart illustrating an example method for testing vulnerability of a cryptographic function involving a single addition to a side-channel attack.

In the drawings, like reference symbols may indicate like and/or similar components (elements, structures, etc.) in different views. The drawings illustrate generally, by way of example, but not by way of limitation, various implementations, and aspect of those implementations discussed in the present disclosure. Reference symbols shown in one drawing may not be repeated for the same, and/or similar elements in related views. Reference symbols that are repeated in multiple drawings may not be specifically discussed with respect to each of those drawings, but are provided for context between related views. Also, not all like elements in the drawings are specifically referenced with a reference symbol when multiple instances of an element are illustrated.

DETAILED DESCRIPTION

This disclosure is directed to approaches for directly mounting side-channel attacks (e.g., without use of a template table) on cryptographic hash function implementations, e.g., such as Secure Hash Algorithm 2 (SHA-2) implementations, and cryptographic constructions, e.g., Hash Message Authentication Code (HMAC) implementations that utilize such cryptographic primitives. More specifically, this disclosure describes implementations of direct side-channel attacks on both invocations, e.g., inner and outer invocations, of a SHA-2 hash function of an HMAC implementation. That is, using the approaches described herein, a direct side-attack on either hash function invocation of an HMAC implementation can be performed successfully. While the approaches disclosed herein are generally described with respect to attacks on SHA-2 implementations and associated HMAC-SHA-2 implementations, the described approaches could be used for mounting a side-channel attack on other cryptographic implementations.

Initially in this disclosure, considerations for mounting a side-channel attack and an overview of the disclosed side-channel attack implementations, e.g., using carry-based differential power analysis (CDPA), are described. Fundamentals of CDPA are then described. After the discussion of CDPA fundamentals, details regarding a multi-stage CDPA implementation for attacking SHA-2 implementations in the context of HMAC-SHA-2 constructions are described. Further, following a discussion of the multi-stage CDPA implementations, real-world considerations, e.g., such as correlated noise and heuristics for compensating for and/or counteracting those real-world considerations are described. Finally, experimental results for the approaches described herein are described.

Considerations for Side-Channel Attacks on SHA-2 and HMAC (e.g., HMAC-SHA-2)

Side-channel attacks are a class of attacks that can be used to expose secret information (e.g., secret keys, key derivatives, etc.) of cryptographic algorithms by observing side effects of algorithm execution. For instance, such secret information can be leaked (e.g., determined) from various channels during algorithm execution. For instance, such channels can include execution timing, electromagnetic emanation, cache miss patterns, variations in power consumption, exotic channels such as acoustics, and so forth.

There are a number of reasons for the resilience or resistance of HMAC implementations (HMAC constructions, etc.) against side-channel attacks. A first reason for such resilience or resistance is the structure of HMAC itself, which involves two invocations of its underlying hash function on a secret key K, called an "inner hash" and an "outer hash". Even if an attack is mounted with full control over input data, and manages to break the inner hash, an attacker can discover the input to the outer hash, but still cannot choose that input to the outer hash, which severely limits the possibilities for breaking the outer hash of HMAC. By way of illustration, HMAC is defined in as:

$$HMAC_{Hash}(K, M) = \text{Hash}((K_0 \oplus opad)\|\overbrace{\text{Hash}(\underbrace{(K_0 \oplus ipad)\|M)}_{\text{inner hash}})}^{\text{outer hash}}), \quad \text{(Eq. 1)}$$

where H is an approved hash function, $K_0$ is a known function of the secret key K, M is the input message, and ipad and opad are known constants.

A second reason for resistance of HMAC constructions to side-channel attacks is due to implementation details of approved hash functions (e.g., SHA-1 and SHA-2 hash functions), which involve arithmetic addition. For instance, side-channel attacks generally benefit from substantial leakage as a result of even small changes in input data. This allows for using a small hypothesis space with good separation when mounting an attack. Accordingly, functions that amplify small changes in the input present an easy target for these attacks. For example, S-boxes, heavily used in block ciphers, can provide a good target for such attacks, as a change of a single input bit of an S-box changes many bits of its output. In contrast, the XOR function provides a difficult target, as it provides no amplification at all, i.e., a change in one bit of the input causes a change only in the same bit of the output. Arithmetical addition is similar to XOR, with only slightly better average amplification, i.e., a one-bit change in the addend, on average, results, on average, in two bit changes in the resulting sum. In other words, functions with low amplification generate low leakage, making leakage analysis of multi-bit words difficult, which makes hash functions implemented using arithmetic addition difficult targets for side-channel attacks.

Overview of CDPA Side-Channel Attacks

The approaches for side-channel attacks described herein limit analysis to small bit windows, for instance as small as a one-bit analysis window, while averaging away leakage (side-channel leakage) associated with bits outside the analysis window (e.g., as a result of using uniformly distributed attack traces) to determine or develop hypotheses for unknown values bit by bit. Further, the approaches for side-channel attacks described herein are performed using carry-based differential power analysis (CDPA) techniques, such as described herein. The described approaches for side-channel attacks facilitate attacks on cryptographic primitives (e.g., SHA-2 hash functions) and associated cryptographic constructions (e.g., HMAC) that involve arithmetical addition (e.g., have low leakage amplification).

The disclosed attacks operate based on the Hamming distance model, where a target of the attack is an arithmetical addition of a secret addend to a known addend that replaces a secret previous value in a target register. Leakage information (e.g., side-channel leakage) to determine Hamming distances for facilitating the disclosed attack can be gathered using various acquisition techniques, such as measuring a supply current or measuring electromagnetic (EM) radiation. Hypotheses for the secret addend and the secret previous value in the target register are discovered bit by bit, from a least-significant bit (LSB) to a most-significant bit (MSB) in a series of steps indexed as i, where the hypotheses are based on a carry bit from a current bit position into a next bit. For instance, for a given hypothesis at a given step i, the i-1 previous bits of the secret addend are already known from the previous steps, and the goal is to find bit i. Using the knowledge of the known bits of the secret addend, a set of possible values of the known addend are split into two pairs of subsets such that an average difference of the Hamming distances between the two subsets in each pair depends only on the carry into the target bit i. This average difference can be estimated using a set of Hamming distances corresponding to a sufficiently large set of randomly distributed values of the known addend, from which a border value at which the sign of the difference switches due to the change in the carry bit to the target bit can be found.

When using the disclosed approaches for mounting an attack on an HMAC-SHA-2 construction, two additions of respective known addends and respective unknown addends are performed simultaneously, rather than a single addition. Accordingly, at each bit position i, two, rather than one, border values, at which the two respective carry bits change are to be discovered. In such implementations, whenever the two values coincide, or are close to one another, a set of attack traces can be split into four or more equally sized subsets, while in other cases the traces may be split into 8 or more equally or unequally sized subsets to determine the respective bits at position i. In some instances (e.g., based on a total number of traces) some of the subsets may be too small to determine the bit values, and a larger number of traces may be used for the attack. The number of traces for recovering the respective values of the secret addends depends on a relationship between the secret addends. That is, if the secret addends have matching sequences of bit values, a higher number of traces may be used to discover their values (e.g., once a permutation between the bit sequences of the secret addends is encountered). Nevertheless, using the approaches described herein in combination with an appropriate number of traces under the Hamming distance leakage model, a given secret value (e.g., a data word of a SHA-2 secret initial state) can be revealed.

In real world implementations (e.g., hardware implementations as compared to simulated and/or software implementations), side-channel leakage can include noise in addition to a part of the leakage proportional to, or corresponding with the Hamming distance. In particular, side-channel leakage can, e.g., in hardware implementations, include noise from operations performed in combinational logic, which involve the known addend. Accordingly, this type of noise is correlated with the Hamming distance on the registers. While, theoretically, such noise could prevent an attack using the disclosed approaches from succeeding, in experiments based on power consumption measurements with a randomly chosen key, the disclosed side-channel attack approaches had success rates from 3% at 30K traces to 100% at 275K traces. In implementations in which side-channel leakage is measured as electromagnetic (EM) radiation using an appropriately positioned probe, the respective number of traces used to mount successful attacks on the same cryptographic implementations could be reduced.

Fundamentals of CDPA

FIG. 1 is a flowchart illustrating a method 100 for testing for vulnerability of a cryptographic function to a side-channel attack using the approaches described herein (e.g., using CDPA as described herein). For instance, in example implementations, the method 100 can be used to test cryptographic functions involving a single addition for vulnerability to side-channel attack. As shown in FIG. 1, at block 110, the method 100 includes providing a plurality of input values to a cryptographic function. In some implementations, the cryptographic function can be the secure hash algorithm 1 (SHA-1), or a HMAC cryptographic function implemented using a hash function involving a single addition. For instance, the cryptographic function, for each input value of the plurality of input values can calculate a sum of the input value and a first value of the cryptographic function, and replace a second value of the cryptographic function with the sum.

At block 120, the method 100 includes measuring a set of side-channel leakage samples. For instance, the set of samples can include, for each input value of the plurality of input values, a respective side-channel leakage sample.

The example method 100 includes, at block 130, iteratively performing a series of operations. The operations of block 130 include, at block 130a, splitting the set of samples into a plurality of subsets based on the plurality of input values. The operations of block 130 also include, at block 130b, for each subset of the plurality of subsets, calculating a respective value based on samples of the subset. The respective values can be, for example, respective averages or values based on higher moments of the subsets. The operations of block 130 further include, at block 130c, comparing the respective values for different subsets to discover bit values of the first value and bit values of the second value. In example implementations, the series of operations of block 130 can be used to iteratively discover bit values of the first value and bit values of the second value from respective least significant bits (LSBs) to respective most significant bits (MSBs).

At block 140, the method 100 includes respectively comparing the discovered bit values of the first value and the discovered bit values of the second value to the first value and the second value to determine if the discovered bit values of the first value and the discovered bit values of the second value are correct, where the comparison provides an assessment of the vulnerability of the cryptographic function to a side-channel attack.

In example implementations, each iteration of the series of operations of block 130 can discover one or more bit values of the first value and one or more bit values of the second value. Splitting the set of samples in the plurality of subsets at block 130a can be further based on previously discovered bit values of the first value and the second value (e.g., discovered from previous iterations). In example implementations, the method 100 can be used to test cryptographic functions implemented in hardware or software.

Further details of CDPA, which can be used for implementing the method 100, are discussed below.

Initially, a notation related to the discussion of CDPA, and associated side-channel attacks is provided. For instance, the operator ⊕ indicates the XOR function. X [j] indicates the bit number j of an integer X, where index 0 indicates the least significant bit of X.X[j: k] indicates the binary number represented by the bits [j: k] of an integer X (from the most significant to the least significant) if j≥k, and 0 if j<k. Further, the Hamming distance between integers X and Y is defined as:

$$HD(X,Y)=\Sigma(X[i] \oplus Y[i]) \quad \text{(Eq. 2)},$$

and the Hamming distance between bits [j: k] of the integers X and Y is defined as:

$$HD_{(j:k)}(XY) = \sum_{i=k}^{i} (X[i] \oplus Y[i]). \quad \text{(Eq. 3)}$$

The example approaches for CDPA discussed below are described with respect to a device that performs arithmetic addition X+W, where X is an N-bit secret value, and W is a known N-bit input. The N least significant bits of the arithmetic addition result then overwrite a register, where the overwritten register contains another N-bit secret value, Y. Since, in this example, the arithmetic addition is N-bit, i.e., modulo $2^N$, the N-bit numbers can be elements of cyclic additive group $C_{2^N}$, and the addition and subtraction discussed below are in the sense of this cyclic additive group.

For a given (known) input value W (e.g., in an ideal implementation without noise), an attacker can obtain the Hamming distance as:

$$L_{(X,Y)}(W)=HD(X+W,Y) \quad \text{(Eq. 4)}$$

between the two states of the register as a side-channel leakage. Based on the foregoing, and using multiple experiments with known values of the input word W whose bits are distributed independently and uniformly, CDPA can be used to find the secret values X and Y bit by bit. For purposes of the following discussion, in the expression $L_{X,Y}(W)$, the indices X, Y are omitted when they are implied.

In this example, approaches for finding the secret values X and Y are based on the observation that the function ∂L(W), described below, only changes it sign twice, where a corresponding cyclic additive group $C_{2^N}$ is depicted as a circle, such as the circle 210a in FIG. 2A, or the circle 210b in FIG. 2B. As shown in FIG. 2A, for a given W∈$C_{2^N}$:

$$W^*=W+2^{N-1} \quad \text{(Eq. 5)},$$

where W* is an opposite point on the circle, as shown on the circle 210a in FIG. 2A. Here, W and W* differ only in their most significant bits, as do X+W and X+W*. Accordingly, W**=W.

Therefore, it can be denoted that:

$$L^*(W)=L(W^*) \quad \text{(Eq. 6)}$$

and $$\partial L(W)=L^*(W)-L(W) \quad \text{(Eq. 7)}$$

From the foregoing, it can be seen that:
1. ∂L(W*)=−∂L(W).
2. ∂L(W)=±1, or more specifically that, ∂L(W)=1 if the most significant bits of X+W and Y coincide (match), otherwise ∂L(W)=−1.
3. There are exactly two points on the circle at which ∂L(W) switches its sign, that is when W changes from −X−1 to −X, and when W changes from −X*−1 to −X*, such as shown by the circle 210b of FIG. 2B.

It can then be denoted that:

$$\partial^2 L(W)=\partial L(W)-\partial L(W-1) \quad \text{(Eq. 8)},$$

from which it can be determined that the function $\partial^2 L(W)$ is 0 everywhere except for the two points −X and −X*, where it assumes values±2. Assuming that an attacker is allowed to choose W as they wish, the attacker can evaluate $\partial^2 L(W)$ for all values of W, find the pair of points at which ∂L(W) changes its sign, and deduce the pair (X, X*), or equivalently, deduce the value of:

$$T=X[N-2:0] \quad \text{(Eq. 9)}.$$

It is noted that in some implementations, it is possible to achieve the same goal by evaluating $\partial^2 L(W)$ at N chosen points only.

From the foregoing, it can then be seen that:

$$\partial L(0) = (1 \oplus X[N-1] \oplus Y[N-1]) - (X[N-1] \oplus Y[N-1]) = \begin{cases} +1 & \text{if } X[N-1] \oplus Y[N-1] = 0 \\ -1 & \text{if } X[N-1] \oplus Y[N-1] = 1 \end{cases}, \quad \text{(Eq. 10)}$$

making it possible to deduce the value of X[N−1]⊕Y[N−1] as:

$$X[N-1] \oplus Y[N-1] = \begin{cases} 0 & \text{if } \partial L(0) = +1 \\ 1 & \text{if } \partial L(0) = -1 \end{cases} \quad \text{(Eq. 11)}$$

or equivalently as:

$$X[N-1] \oplus Y[N-1] = \begin{cases} 0 & \text{if } \partial^2 L(T) = -2 \\ 1 & \text{if } \partial^2 L(T) = +2 \end{cases}, \quad \text{(Eq. 12)}$$

where T is defined by Equation 9 above.

The approach, as discussed thus far, for finding the secret values X and Y provides part of the desired information. However, there additional portions missing, and details requiring consideration. For instance:
1. X [N−1] cannot be discovered, only X[N−1]⊕Y[N−1], which is due to the fact that a simultaneous flip of X[N−1] and Y [N−1] does not affect L(W).
2. No bits of Y have yet been discovered. The approach for determining the bits of Y will be discussed below.
3. The approach, as described assumes known bit-wise uniformly distributed, rather than chosen, values of W.

In order to eliminate the assumption of chosen values for W, several additional observations should be considered. Before discussing those observations, a number of definitions useful for understanding those observations are provided.

Definition 1. For natural numbers N and k, a function F: $C_{2^N} \to \mathbb{R}$ is called a k-step function if $C_{2^N}$, seen as a cyclic sequence, can be split into k intervals (not necessarily of equal sizes) such that in each interval the function F is constant.

Definition 2. For natural numbers N and k, a function F: $C_{2^N} \to \mathbb{R}$ is called a k-peak function if it is different from 0 in at most k points.

It is noted that in both Definition 1 and Definition 2, k need not be a minimal number with one of the above properties. Accordingly, if k n then any k-step (k-peak) function is also an n-step (n-peak) function.

Definition 3. For a natural number N, a function F: $C_{2^N} \to \mathbb{R}$ is called odd if:

$$\mathring{A}(W \in C_{2^N})(F(W)) = -F(W^*)).$$

Definition 4. For F: $C_{2^N} \to \mathbb{R}$ and $M \subset C_{2^N}$, F(M) is by definition the average value of F over the subset M.
In these definitions, $\partial L(W)$ is an odd 2-step function, and $\partial^2 L(W)$ is an odd 2-peak function.

In view of the foregoing definitions, the additional observations that should be considered are:

1. If $\partial L(W)$ is guaranteed to be constant in an interval M of $C_{2^N}$, then:

$$\mathring{A}(W \in M)(\partial L(W) = \partial L(M) = L^*(M) - L(M)) \quad \text{(Eq. 13)}$$

2. It is possible to analyze the addition, limited to the i least significant bits (i<N), modulo $2^i$ in the same way as full N-bit addition modulo $2^N$ is analyzed.
3. If T=X [i−2:0] is known (as shown by circle 310a in FIG. 3A), then modulo $2^{i+1}$ there are four intervals $M_0$, $M_1$, $M_2$, $M_3$ corresponding to different values of (T+W) [i: i−1], at which the 2-peak function $\partial L(W)$(modulo $2^{i+1}$) is guaranteed to be constant, with two options for the pair of points where the sign of $\partial L(W)$ changes, as shown, respectively, by circle 310b in FIG. 3B and circle 310c in FIG. 3C.
4. Since the definition of the intervals $M_k$(where k=0, 1, 2, 3, as described above) depends only on the bits (T+W)[i: i−1], and since the bits of W are, by assumption, distributed uniformly and independently, the average value of (X+W)[k]⊕Y[k], where k≠i, k≠i−1, in any one of these subsets is close to 0.5, and its deviation from 0.5 decreases inversely proportionally to the square root of the subset size. Additionally, in each pair of the opposite sets ($M_0$ and $M_2$, $M_1$ and $M_3$) the bit (T+W)[i−1] has identically the same value. Therefore, when estimating $\partial L(M_k)$ based on the experimental data, all the terms, except for the one corresponding to the bit position i, cancel out asymptotically, and the total deviation decreases inversely proportionally to the square root of the subset size. Therefore, for a sufficiently large set of values of W, this total error is small enough for an attacker to be able to find out whether the value is +1 or −1.

In view of the observations (and the foregoing discussion), a practical attack with known (and not necessarily chosen) input W can be performed in a series of steps (or operations) i, with the steps being numbered from 1 to N−1, in ascending order, as follows. The prerequisite for each step i is knowledge of T=X[i−2:0]. (It is noted that, for step i=1, this indicates that there are no prerequisites.) The analysis at step i is modulo $2^{i+1}$. A set of traces being used for an attack is split into four subsets $M_k(0 \le k < 4)$, e.g., as shown by FIGS. 2B and 2C, and $L(M_k)$ is estimated by averaging L(W) over a large uniformly distributed subset of $M_k$. Then, from the pair of points at which $\partial L(Mk)$ changes its sign we deduce X[i−1], which ensures the prerequisite for step i+1. Additionally, from the direction of this change (in other words, from the sign of $\partial^2 L(Mk)$), we can deduce X[i]⊕Y[i], according to Equation 12 above.

After completing steps 1 to N−1, X[N−2:0] and X[i]⊕Y [i] for 0<i<N are known. From this Y[N−2:1] can be easily calculated.

At this point, the only missing bit of the secret values X and Y is now bit Y[0]. In order to find Y[0], an additional step can be performed. The additional step is done with analysis modulo 2, from which X[0]⊕Y[0] can be deduced from the sign of $\partial L(M_0) = L(M_1) - L(M_0)$, according to Equation 11 above. Since X [0] is already known, Y [0] can be calculated. This step is independent of all other steps and can be performed at any point of time during the attack to find the secret values X and Y.

After all the above steps, X[N−2:0], Y[N−2:0] and X[N−1]⊕Y[N−1] are known or, equivalently, two hypotheses regarding (X, Y), corresponding to the two possible values of X[N−1] are known. If the disclosed implementations for mounting a CDPA side-channel attack are used for vulnerability testing, these two hypotheses can be evaluated to determine if either one is the correct.

Attack on SHA-2 and/or HMAC-SHA-2

Figure 4:
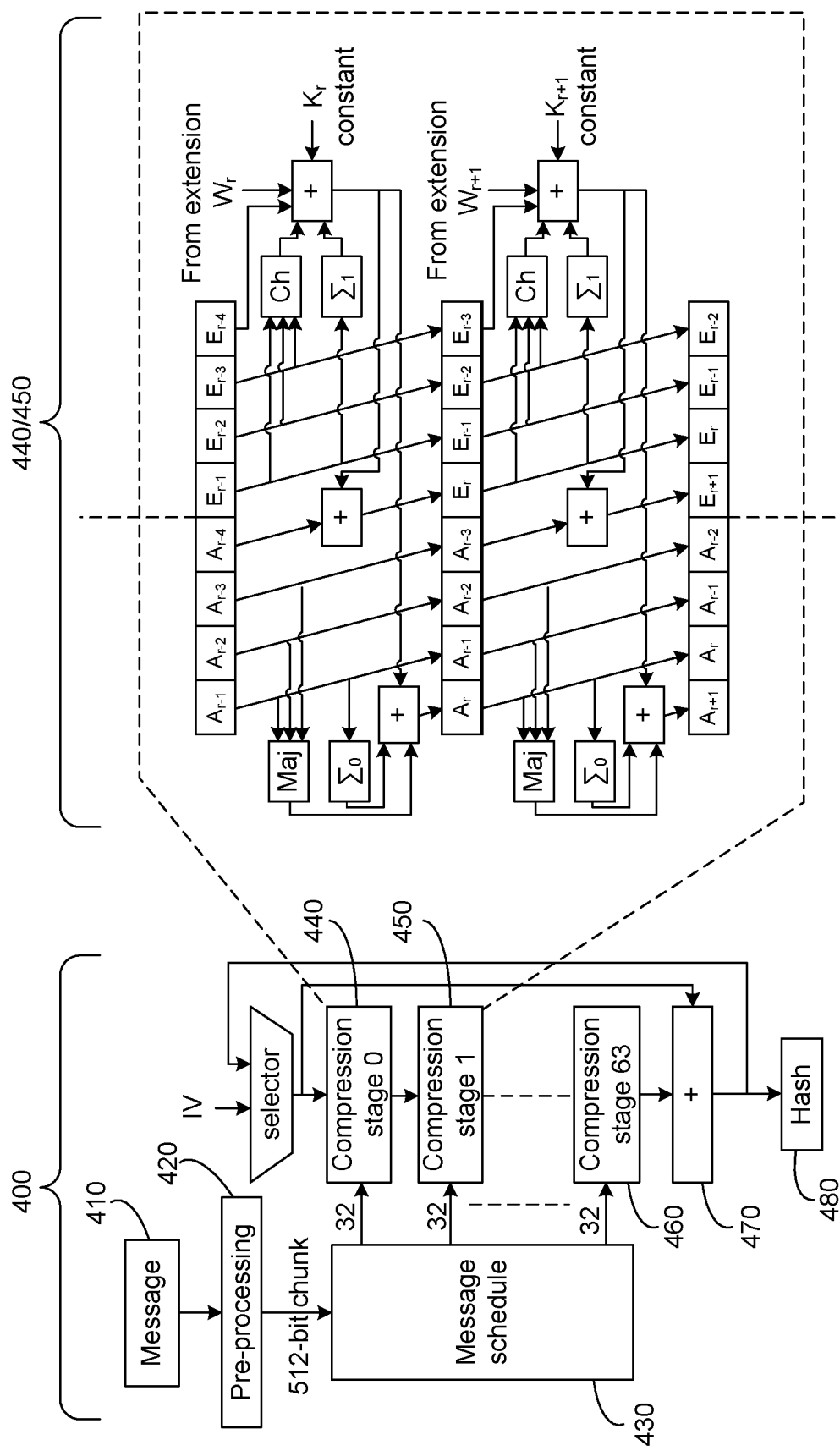
FIG. 4 is a block diagram illustrating an example secure hash algorithm 2 (SHA-2) hash function.
Figure 5:
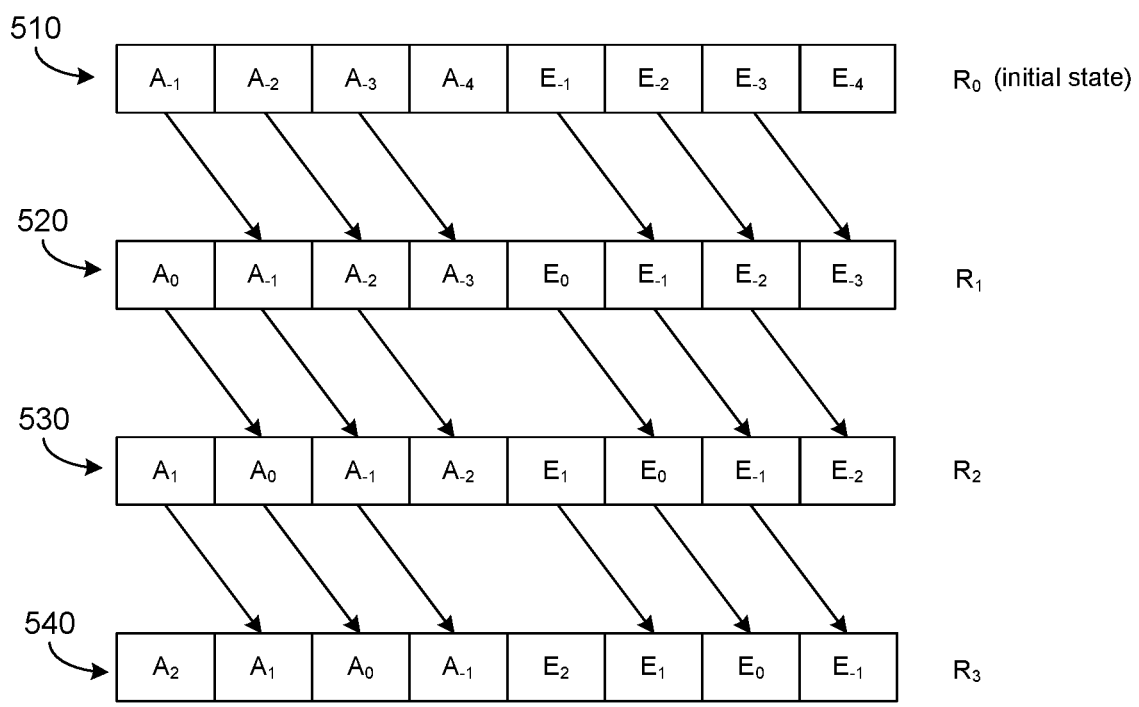
FIG. 5 is a block diagram schematically illustrating an example of execution of multiple rounds of a compression function of a SHA-2 hash function.
Figure 6A:
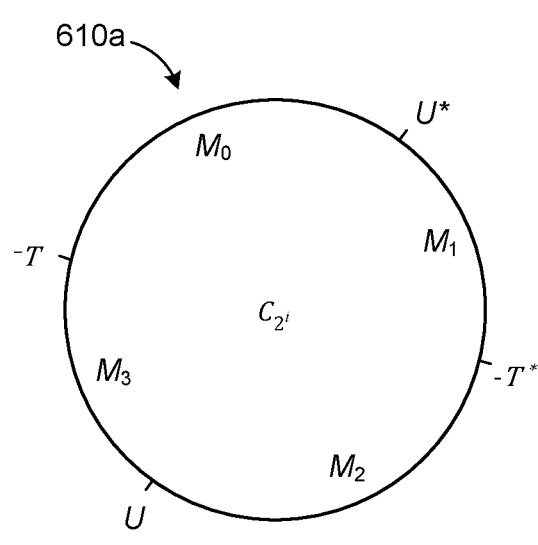
FIGS. 6A and 6B are diagrams illustrating example cyclic additive groups.
Figure 6B:
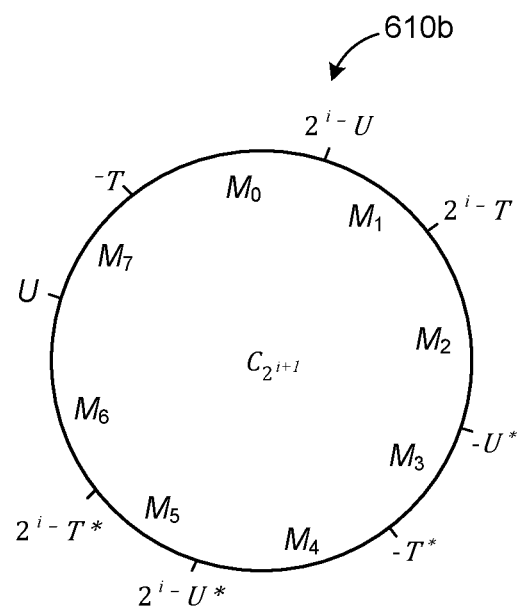

As noted above, implementations of CDPA side-channels attacks, which can be used to test for vulnerability of cryptographic constructions, are described as being mounted on, or applied to SHA-2 hash function implementations and associated HMAC implementations (e.g., as defined in Equation 1) that are implemented using a SHA-2 hash function, e.g., a SHA-256 hash function. As context for discussion of these approaches, following is a discussion of SHA-2, HMAC, as well as a specific (alternate) notation for SHA-2 that is used for discussion of the approaches. For instance, FIG. 4 is a block diagram illustrating a SHA-2 hash function implementation according to an aspect, FIG. 5 is a diagram illustrating the specific notation for SHA-2 used herein, and FIG. 6 is a block diagram illustrating an HMAC data flow for a one-block message. It is noted that, for purposes of brevity, some details of the SHA-2 hash function implementation shown in FIG. 4 not directly relevant to the disclosed approaches may not be specifically described herein.

Referring to FIG. 4, an execution flow 400 for a SHA-256 hash function is shown. As illustrated in FIG. 4, an input message 410 (e.g., of arbitrary length) is provided to a pre-processing stage 420. The pre-processing stage 420 generates a message schedule 430 based on 512 bit chunks or blocks. The message schedule 430, which is generated by the expanding a corresponding 512 bit block, can then be output, as sixty-four (64) 32-bit words to 64 respective compression function stages (stage 0 to stage 63), of which compression stage 0 440, compression stage 1 450, and compression state 63 460 are shown. The compression function stages can also be referred to as rounds (calculation rounds). FIG. 4 also illustrates a detailed diagram of two 256-bit wide compression stages of the illustrated SHA-256 hash function (e.g., compression stages 440, 450).

The SHA-2 family of hash algorithms (including the SHA-256 function of FIG. 4) utilize the Merkle-Dåmgard construction, in which the input message 410 (properly padded) is represented as a sequence of blocks $Bl_0$, $Bl_1, \ldots, Bl_{n-1}$, and the hash function is iteratively calculated (using the compression stages and an arithmetic stage 470) as $St_{j+1} = (F(St_j, Bl_j)$ for $0 \le j < n$. (F is the hash algorithm's compression function, $St_0$ is a predetermined constant, and $St_n$ is the final output (the hash value 480). The compression function $(F(St_j, Bl_j)$ for SHA-2 hash functions is calculated in the following steps (as is shown for SHA-256 in FIG. 4):

1. The message schedule 430 expands the input block B/j to a sequence of s×N-bit "words" $W_0, W_1, \ldots, W_{s-1}$, where s=64, N=32 for SHA-224 and SHA-256; and s=80, N=64 for SHA-512/224, SHA-512/256, SHA-384 and SHA-512. The particular details of how the expansion algorithm operates do not affect the approaches for a CDPA attack, as described herein.
2. The round function RF is applied s times (e.g., by the compression stages 440, 450 . . . 460) so that $R_{r+1}$=RF ($R_r$, $W_r$, $K_r$) for $r \in [0, 1, \ldots, s-1]$ where $K_r$ are predefined "round constants", and $R_0 = St_j$.

3. An output of the compression function CF is then calculated as a word-wise sum modulo $2^N$ of $R_0 = S_j$ and $R_s$.

For the round function RF, the internal state $R_r$ before round r is split into eight N-bit words. While in the standard definition of SHA-2 these eight words are referred to as A,B,C,D,E,F,G,H, for purposes the discussion herein they are denoted differently as, respectively, $A_{r-1}, A_{r-2}, A_{r-3}, A_{r-4}, E_{r-1}, E_{r-2}, E_{r-3}, E_{r-4}$. This notation is more convenient for the following discussion, as it is based on the fact that that only two words of the internal state at each round, $A_r$ and $E_r$, are calculated at round r, while the other words are shifted right in the array, such as shown in FIG. 5.

For instance, FIG. 5 schematically illustrates, for a SHA-2 implementation based on the above-described alternate notation, an initial internal state 510 (state $R_0$) and resulting, respective internal states 520, 530, 540 for three successive rounds (respectively $R_1$, $R_2$, and $R_3$). In the example of FIG. 5, as in FIG. 4, arrows show copy operations, where all words of a given internal state that have incoming arrows receive an exact copy of a word from the internal state of the previous round. The remaining words of the internal states (without incoming arrows, or copied values) receive results of manipulated data from the previous round (e.g., newly calculated or generated words).

As shown in FIG. 5, based on the alternate notation, the eight words of the initial internal state $R_0$ 510 of $A_{r-1}, A_{r-2}, A_{r-3}, A_{r-4}, E_{r-1}, E_{r-2}, E_{r-3}, E_{r-4}$ (r=0) are designated, respectively, as $A_{-1}, A_{-2}, A_{-3}, A_{-4}, E_{-1}, E_{-2}, E_{-3}, E_{-4}$. As further shown in FIG. 5, the eight words of the internal state $R_1$ 520 after round 1 (r=1) are designated, respectively, as $A_0, A_{-1}, A_{-2}, A_{-3}, E_0, E_{-1}, E_{-2}, E_{-3}$. As also shown in FIG. 5, the eight words of the internal state $R_2$ 530 after round 2 (r=2) are designated, respectively, as $A_1, A_{-1}, A_{-2}, A_{-3}, E_1, E_{-1}, E_{-2}, E_{-3}$. As still further shown in FIG. 5, the eight words of the internal state $R_3$ 540 after round 3 (r=3) are designated, respectively, as $A_2, A_1, A_0, A_{-1}, E_2, E_1, E_0, E_{-1}$.

The purpose for use of this indexing for describing the disclosed approaches for mounting a CDPA attack to test for vulnerability of cryptographic constructions to side-channel attacks is to assign the index 0 to the result of the first calculation at round 1, and to assign negative indices to words of the internal state that are merely copies of the initial state $R_0$ 510, as shown in FIG. 5. Therefore, using the alternate notation, as noted above, the only two words of the internal state that are newly calculated or generated at every round r are $A_r$ and $E_r$, which are calculated as follows (where all the addition operations are modulo 2N):

$$\in_r = E_{r-4} + \Sigma_1(E_{r-1}) + Ch(E_{r-1}, E_{r-2}, E_{r-3}) + K_r \quad \text{(Eq. 14)}$$

$$\alpha_r = \Sigma_0(A_{r-1}) + Maj(A_{r-1}, A_{r-2}, A_{r-3}) \quad \text{(Eq. 15)}$$

$$\Delta E_r = A_{r-4} + \in_r \quad \text{(Eq. 16)}$$

$$\Delta A_r = \in_r + \alpha_r \quad \text{(Eq. 17)}$$

$$E_r = \Delta E_r + W_r \quad \text{(Eq. 18)}$$

$$A_r = \Delta A_r + W_r \quad \text{(Eq. 19)}$$

$$Ch(x,y,z) = (x \wedge y) \oplus (\neg x \wedge z) \quad \text{(Eq. 20)}$$

$$Maj(x,y,z) = (x \wedge y) \oplus (x \wedge z) \oplus (y \wedge z) \quad \text{(Eq. 21)}$$

where Ch is the bit-wise choice function, and Maj is the bit-wise majority function.

As can be seem from the foregoing, calculation of $\Delta A_r$ and $\Delta E_r$ depends on the previous state $R_r$ but not on $W_r$. In particular, the calculation of $\Delta A_0$ and $\Delta E_0$ depends only on the initial state $R_0$. While different in notation, this definition is consistent with the standard definition of the round function of any hash function from the SHA-2 family. The difference between different functions in the SHA-2 family is only in N, the constants Kr, and the definitions of the functions $\Sigma_0$, $\Sigma_1$ (which is not relevant for purposes of the disclosed approaches).

As previously discussed, HMAC is a Message Authentication Code (MAC) algorithm that is based on a hash function, where an HMAC construction is defined by Equation 1 presented above. In HMAC implementations, derivation of a modified key $K_0$ from a secret key K, regardless of the size of K, the size of $K_0$ is equal to a block size of the function Hash used to implement the HMAC construction. The two applications of the function Hash during the HMAC calculation can be referred to as an "inner" application or invocation and an "outer" application or invocation.

If Hash is a function from the SHA-2 family, e.g. SHA-256, then for a fixed K the first application of the SHA-256 compression function in the inner hash of SHA-256 calculates $St_{in} = CF(St_0, K_0 \oplus ipad)$, and in the outer hash of SHA-256 calculates $St_{out} = CF(S_0, K_0 \oplus opad)$. Note that both $St_{in}$ and $St_{out}$ depend only on K. The goal of the disclosed attack approaches is to find $St_{in}$ and $St_{out}$. Since it is difficult to invert a compression function (e.g., of a SHA-2 hash function), it follows that it is difficult to derive K or $K_0$ from $St_{in}$ and $St_{out}$. However, in order to mount a successful attack, such derivation of K or $K_0$ is not necessary, because an attacker who knows both $St_{in}$ and $St_{out}$ (for an HMAC construction based on SHA-256) can forge $HMAC_{SHA256}(K, M)$ for any message M, which is the ultimate goal of an attack on a MAC algorithm.

Based on the foregoing, it follows that, in order to find $St_{in}$ and $St_{out}$ in such implementations, both the inner and outer SHA-256 must be attacked. In the disclosed approaches, there is a subtle difference between mounting the two attacks (inner hash and outer hash). That is, when attacking the inner hash of SHA-256, an attacker may choose the message M. This is not the case with attacking the outer hash of SHA-256, because the variable part of the input to it is the padded output of the inner SHA-256, $Bl_{out,1}$, which may be known to the attacker after a successful attack of the inner hash, but cannot be chosen arbitrarily. This factor makes designing an attack on the outer SHA-256 more difficult. The approaches described herein for mounting a CDPA attack without a profiling stage work for attacking both the inner hash function invocation and the outer hash function invocation of HMAC constructions (e.g., implemented using SHA-2 hash functions), as these approaches can be implemented without a chosen input.

For a CDPA attack on a SHA-2 hash function implementation, e.g., standing alone of included in an HMAC construction, the Hamming distance between subsequent internal states can be denoted as follows:

$$S_r = HD(R_r, R_{r+1}), \text{ for } 0 \leq r < n \quad \text{(Eq. 22)}$$

A device implementing one of the functions of the SHA-2 family calculates its compression function with a secret initial state, i.e., it iteratively invokes the round function with a known sequence of input words, starting from the secret initial state $R_0$. From every such calculation, an attacker can obtain a sequence of $W_r$ and a corresponding sequence of $S_r$, with an objective of finding $R_0$.

In example implementations, a CDPA side-channel attack on a SHA-2 family hash function (or an HMAC construction using a SHA-2 has function) can include three stages. At stage 1, all possible information is extracted from samples corresponding to round 0 ($S_0$). The result of stage is a set of hypotheses regarding two words of the secret initial state and two words which are functions of the secret initial state. At stage 2, all possible information is extracted from samples corresponding to round 1 ($S_1$). The result of stage 2 is a set of hypotheses regarding the entire secret initial state. At stage 3, all the incorrect hypotheses are rejected using samples corresponding to later rounds, until only the correct hypothesis remains.

If the attack is performed to check for vulnerability of a device implementing a cryptographic function (e.g., a SHA-2 hash function) for which the secret initial state is known, one or more portions of such a three stage attack can be omitted. For instance, after completing stage 1, a resulting set of hypotheses can be examined to determine whether the set includes a hypothesis with the corresponding correct values of the initial state. If a hypothesis with the correct values is identified, then stage 2 can be applied only to the correct hypothesis, (unlike an attack in which the correct initial state is not known, allowing for the correct hypothesis to be identified, for which stage 2 is applied to every hypothesis of the set of hypotheses from stage 1). After stage 2, the set of hypotheses produced at stage 2 can be examined to determine if it includes a hypothesis with the correct, entire initial state and, if such a hypothesis is identified, stage 3 can be omitted.

By way of example, the following is further discussion of details of each of the three stages. Still further details regarding stage 1 and stage 2 of an example implementation are discussed below.

At stage 1, as noted above, round 0 is analyzed. In this round:

$$S_0(W_0) = L\Delta A_0, A_{-1}(W_0) + L\Delta E_0, E_{-1}(W_0) + \text{const} \quad \text{(Eq. 23)},$$

where const is a sum of six Hamming distances corresponding to the respective replacement of the constants $A_{-2}$, $A_{-3}$, $A_{-4}$, $E_{-2}$, $E_{-3}$, $E_{-4}$ with constants $A_{-1}$, $A_{-2}$, $A_{-3}$, $E_{-1}$, $E_{-2}$, $E_{-3}$. During stage 1 $\Delta A_0$, $A_{-1}$, $\Delta E_0$, $E_{-1}$ are determined by analysis of:

$$\partial S_0(W_0) = \partial L \Delta A_0, A_{-1}(W_0) + \partial L \Delta E_0, E_{-1}(W_0) \quad \text{(Eq. 24)},$$

which is derived using the CDPA fundamentals described above. Two additions, instead of one, increases the complexity of the task, and the result of stage 1 is a set of $2^k$ hypotheses regarding $\Delta A_0$, $A_{-1}$, $\Delta E_0$, $E_{-1}$, where $k \geq 3$.

At stage 2, as also noted above, round 1 is analyzed. During this stage, for every hypothesis from stage 1, the hypothesis is either rejected, or a corresponding hypothesis for all the still unknown words of the secret initial state, $A_{-2}$, $A_{-3}$, $A_{-4}$, $E_{-2}$, $E_{-3}$, $E_{-4}$, is determined. As discussed above, when checking for vulnerability of a device for which an initial secret state is known, it can be sufficient to apply stage 2 to the correct values of A, E, $\Delta A$, $\Delta E$ only (e.g., stage 3, as discussed below, can be omitted for such vulnerability testing).

At stage 3, for every hypothesis regarding the full initial internal state, the Hamming distances at each round can be calculated. Those calculated values can them be compared with corresponding experimentally obtained values ones. Based on these comparisons, all of the hypotheses except for the correct hypothesis will be rejected.

Referring again to stage 1, that stage can include two substages, substage 1a and substage 1b. During substage 1a, $\Delta A_0$, $\Delta E_0$, up to a permutation between them, and excluding one most significant bit of each can be determined. During substage 1b, a set of hypotheses for $\Delta A_0$, $A_{-1}$, $\Delta E_0$, $E_{-1}$ are determined.

During substage 1a, using CDPA, two simultaneous additions ($\Delta A_0 + W_0$ and $\Delta E_0 + W_0$) are analyzed in a series of steps. At step i for $0 \leq i \leq N$ the analysis is modulo $2^{i+1}$. Prior to each step i, there are j known bits $\Delta A_0[j-1:0]$ and $\Delta E_0[j-1:0]$, where $j \leq i$. In particular, before step 1, j=0, and no bits are known. The value of j is discussed further below.

Before any step i, there are two possible cases, which are described separately following a discussion of three readily east to prove propositions relevant to the two possible cases. The first proposition is that the sum of two odd functions is odd. The second proposition is that the sum of an m-step function and an $n_2$-step function is an $(n_1+n_2)$-step function. The third proposition is that the sum of an m-peak function and an $n_2$-peak function is an $(n_1+n_2)$-peak function. Because $\partial L \Delta A_0, A_{-1}(W_0)$ and $\partial L \Delta E_0, E_{-1}(W_0)$ are odd 2-step functions, and $\partial^2 L \Delta A_0, A_{-1}(W_0)$ and $\partial^2 L \Delta E_0, E_{-1}(W_0)$ are odd 2-peak functions, from the above propositions, it follows that $\partial S_0(W_0)$ is a 4-step function, and $\partial^2 S_0(W_0)$ is a 4-peak function.

The two cases noted above will now be described. For case 1, $\Delta A_0[j-1:0] = \Delta E_0[j-1:0]$. Since, as discussed above, the j least significant bits are known, modulo $2^{i+1}$ for both $\partial L \Delta A_0, A_{-1}(W_0)$ and $\partial L \Delta E_0, E_{-1}(W_0)$ there are $2^{i+1-j}$ intervals at which each function is guaranteed to be constant. Because $i \geq j$, the number of intervals is at least 4. Since $\Delta A_0[j-1:0] = \Delta E_0[j-1:0]$, these are the same intervals for both functions. Similarly to CPDA (e.g., using the CDPA fundamentals described above), $\partial S_0(M_k)$ can be estimated for every subset $M_k$, and at most two pairs of opposite points at which the odd 4-peak function $\partial^2 S_0(W_0)$ is different from 0 can be found.

In this example, there are three subcases for case 1, which are referenced as subcase 1a, subcase 1b and subcase 1c. For subcase 1a, no non-zero values of $\partial^2 S_0(W_0)$ are found, which indicates that the peaks of $\partial^2 L \Delta A_0, A_{-1}(W_0)$ and $\partial^2 L \Delta E_0, E_{-1}(W_0)$ are at the same points, but are opposite in signs. In this subcase (subcase 1a) no information is gained, and substage 1a proceeds to step i+1 without changing the number j of known bits. If subcase 1a occurs for several consecutive bit positions, then the number of subsets needed to determine the unknown bits can grow exponentially, and significantly more experiments may be necessary for the attack to succeed.

For subcase 1b, two non-zero values of $\partial^2 S_0(W_0)$ are found, which indicates that the peaks of $\partial^2 L \Delta A_0, A_{-1}(W_0)$ and $\partial^2 L \Delta E_0, E_{-1}(W_0)$ are at the same points, and the peaks have the same sign, so $\partial^2 S_0(M) = \pm 4$. The pair of points reveals the bits [i-1: j], in addition to the bits [j -1:0] which were already known, and these bit positions still match in the words $\Delta A_0$ and $\Delta E_0$. In this subcase (subcase 1b), j (the updated number of known bits) assumes the value i.

For subcase 1c, four non-zero values of $\partial^2 S_0(W_0)$ are found, which indicates that the peaks of $\partial^2 L \Delta A_0, A_{-1}(W_0)$ and $\partial^2 L \Delta E_0, E_{-1}(W_0)$ are at different points. In other words, in subcase 1c, $\Delta A_0[i-1:0] \neq \Delta E_0[i-1:0]$. In this subcase (subcase 1c), from these two points, both $\Delta A_0[i -1:0]$ and $\Delta E_0[i-1:0]$ can be deduced (up to a permutation between them). If then follows that j=i bits are known for the next step i+1.

For case 2, $\Delta A_0[j-1:0] \neq \Delta E_0[j-1:0]$. This case occurs for the first time after subcase 1c is encountered, and j=i-1 when it does occur. After it occurs once, this will be the case for subsequent bit positions as well. Unlike case 1, in case 2 the number of the known bits before step i is always j=i−1. By way of example, let's denote $T=\Delta A_0[i-2:0]$ and $U=\Delta E_0[i-2:0]$, as illustrated by the circle 610a in FIG. 6A. Taking into account two options for each one of $\Delta A_0[i-1]$ and $\Delta E_0[i-1]$, modulo $2^{i+1}$, there are 8 intervals at which $\partial S_0(W_0)$ is guaranteed to be constant, as is illustrated by the circle 610b in in FIG. 6B. The value of $\partial S_0(W_0)$ can be estimated for each interval, the two pairs of opposite points at which $\partial^2 S_0(W_0)$ changes its sign can be found, and deduce the bits $\Delta A_0[i-1]$ and $\Delta E_0[i-1]$ can be deduced.

Note that, unlike the previous cases, the subsets for case 2 may differ in size. For instance, the more consecutive matching bits there are in $\Delta A_0$ and $\Delta E_0$, the more significant a difference in the sizes of the subsets. If this occurs, it may significantly increase the number of traces necessary for the attack to succeed.

Substage 1b of stage 1 in this example is used to determine $A_{-1}$ and $E_{-1}$ of a secret initial stage (e.g., of a SHA-2 hash function implementation). Substage 1b includes a series of steps numbered from 1 to N-2. At step 1 of substage 1b, $A_{-1}[1:0]$, $E_{-1}[1:0]$ are found, where the analysis is modulo 4. At step 1 of substage 1b, the experiments can be split into four subsets $M_k (0 \le k < 4)$, and according to $W_0[1:0]$, $S_0(M_k)$ is estimated, and the following is calculated:

$$\Delta S_0(k) = S_0(M_{k+1}) - S_0(M_k) \quad (25)$$

for $0 \le k < 3$. On the other hand, for every one of the sixteen possible combinations of bits $A_{-1}[1:0]$, $E_{-1}[1:0]$, the expected values of $\Delta S_0(k)$ for $0 \le k < 3$ are calculated using the explicit expression of $HD_{[1:0]}(\Delta A_0 + W_0, A_{-1}) + HD_{[1:0]}(\Delta E_0 + W_0, E_{-1})$. As a result, most combinations are rejected. The remaining combinations are the set of hypotheses for the next step.

As long as $\Delta A_0[i-2:0] = \Delta E_0[i-2:0]$, step i for every hypothesis is similar to step 1, with the following differences:

1. The analysis is modulo $2^{i+1}$.
2. The bits $A_{-1}[i-1:0]$ and $E_{-1}[i-1:0]$ are known from the previous steps.
3. The target bits are $A_{-1}[i: i-1]$, $E_{-1}[i: i-1]$.
4. Splitting the experiments into four subsets is done according to $(\Delta A_0[i-2:0]+W)[i: i-1]$. ($\Delta S_0(W_0)$ is constant over each one of these subsets).
5. In addition to rejecting the combinations of $A_{-1}[i: i-1]$, $E_{-1}[i: i-1]$ because of mismatch between measured and expected values, combinations may be rejected because of mismatch with already known values of bits $A_0[i-1]$ and $E_0[i-1]$. (In this situation, it may still be that more than one combination will remain.)

As soon as $\Delta A_0[i-2:0] \ne \Delta E_0[i-2:0]$, the implementations described herein become simpler because it becomes possible to separate between $\Delta A_0$ and $\Delta E_0$. The bits $\Delta A_0[N-2:0]$ and $\Delta E_0[N-2:0]$ are known from substage 1, and the analysis is modulo $2^{i+1}$. $C_2 i+1$ is split into 8 subsets in the same way as in case 2, e.g., as described above and illustrated by the circle 610b in FIG. 7B, and the values of $\Delta A_0[i] \oplus A_{-1}[i]$ and of $\Delta E_0([i] \oplus E_{-1}[i]$ are deduced from the sign of $\partial S_0(W_0)$ in the points $\Delta A[i-1:0]$ and $\Delta E[i-1:0]$, according to Equation 12 above. At all the steps except for the step N−1 (the last one), $\Delta A_0[i]$ and $\Delta E_0[i]$ are already known, therefore $A_{-1}[i]$ and $E_{-1}[i]$ are easily found. At the last step i=N−1, we remain with $\Delta A_0[N-1] \oplus A_{-1}[N-1]$ and $\Delta E_0[N-1] \oplus E_{-1}[N-1]$.

After all the steps described above, we have a list of hypotheses regarding:

$(A_0[N-2:0], \Delta A_0[N-2:0], \Delta A_0[N-1] \oplus A_{-1}[N-1],$ $E_0[N-2:0] \Delta E_0[N-2:0], \Delta E_0[N-1] \oplus E_{-1}[N-1])$ Each hypothesis is converted into four corresponding hypotheses regarding:

$(A_0[N-1:0], \Delta A_0[N-1:0], E_0[N-1:0], \Delta E_0[N-1:0])$ by listing all the combinations of $A_{-1}[N-1]$ and $E_{-1}[N-1]$. Note that there is a total of at least eight hypotheses, because of the permutations between the pairs $\Delta A_0, A_{-1}$ and $\Delta E_0, E_{-1}$.

As noted above, after stage 1 there is a set of hypotheses regarding:

$(A_0[N-1:0], \Delta A_0[N-1:0], E_0[N-1:0], \Delta E_0[N-1:0]),$ and at stage 2 each of these hypotheses is analyzed separately, as described below. As a result of this analysis, each hypothesis is either rejected or expanded into a hypothesis regarding the entire initial internal secret state.

For purposes of discussion of stage 2, a sum A-3 and E-3 can be denoted as:

$$AE_{-3} = A_{-3} + E_{-3} \quad (Eq. 26)$$

The analysis at stage 2 is performed in steps i numbered from 0 to N−1. At a given step i, $A_{-2}[i]$, $AE_{-3}[i]$, $E_{-2}[i]$, $E_{-3}[i]$ can be found. If all steps of stage 2 are successful, the remaining words $A_{-3}, A_{-4}, E_{-4}$ of the initial secret state are determined by simple calculation, as described below. The analysis of stage 2 is performed based on the following observations:

1. After stage 1, $A_{-1}$ and $E_{-1}$ are known.
2. After stage 1 $A_0$, $\Sigma_0(A_0)$, $E_0$, $\Sigma_1(E_0)$ are known for every $W_0$.
3. If $E_{-2}[i-1:0]$ and $AE_{-3}[i-1:0]$ are known, then in the expression for $\Delta E_1[i] \oplus E_0[i]$ the only unknown values are $Ch(E_0[i], E_{-1}[i], E_{-2}[i])$ and $AE_{-3}[i]$.
4. If $E_{-2}[i: 0]$, $AE_{-3}[i: 0]$, $A_{-2}[i-1:0]$ and $A_{-3}[i-1:0]$ are known, then in the expression for $\Delta A_1[i] \oplus A_0[i]$ the only unknown values are $Maj(A_0[i], A_{-1}[i], A_{-2}[i])$ and $E_{-3}[i]$.
5. If $M_0$ and $M_1$ are two subsets of the experiments chosen by criteria related to the calculation of $A_1[i]$ (or $E_1[i]$), then in the expression for $S_1(M_0) - S_1(M_1)$ all the terms except for $HD(A_0[i], A_1[i])$ (or $HD(E_0[i], E_1[i])$) are distributed uniformly in both sets and therefore almost cancel out for sufficiently large $M_0$ and $M_1$.

Taking these observations into account, step i is performed as follows:

1. Split the experiments into two subsets $M_0$ and $M_1$ according to the bit $E_0[i]$.
2. If $E_0[i]=1$, then according to Equation 20 above, $Ch(E_0[i], E_{-1}[i], E_{-2}[i]) = E_{-1}[i]$, which is known, and the only remaining unknown term in the expression for $\Delta E_1[i] \oplus E_0[i]$ is $\Delta E_{-3}[i]$, i.e., $\Delta E_1[i] \oplus E_0[i] = AE_{-3}[i] \oplus Q$, where $Q$ is known. In this case, $M_1$ is split into two subsets $M_{10}$ and $M_{11}$ according to the value of $Q$, and from the sign of $S_1(M_{11}) - S_1(M_{10}) \approx \pm 1$ the value of $AE_{-3}[i]$ can be deduced.
3. If $E_0[i]=0$, then according to Equation 20 above, $Ch(E_0[i], E_{-1}[i], E_{-2}[i]) = E_{-2}[i]$, which is now the only remaining unknown term in the expression for $\Delta E_1[i] \oplus E_0[i]$, i.e., $\Delta E_1[i] \oplus E_0[i] = E_{-2}[i] \oplus Q$, where $Q$ is known. In this case, $M_0$ is split into two subsets $M_{00}$ and $M_{01}$ according to the value of $Q$, and from the sign of $S_1(M_{01}) - S1(M_{00}) \approx \pm 1$ the value of $E_{-2}[i]$ can be deduced.
4. Split the experiments into two subsets $M_0$ and $M_1$ according to $A_0[i]\_A_{-1}[i]$ (which are different than the subsets of item 1 above).

5. If $A_0[i]=A_{-1}[i]$ (i.e., $A_0[i] \oplus A_{-1}[i]=0$), then according to Equation 21 above, $Maj(A_0[i], A_{-1}[i], A_{-2}[i])=A_{-1}[i]$, which is known, and the only remaining unknown term in the expression for $\Delta A_1[i] \oplus A_0[i]$ is $E_{-3}[i]$, i.e., $\Delta A_1[i] \oplus A_0[i]=E_{-3}[i] \oplus Q$, where $Q$ is known. In this case, $M_0$ is split into two subsets $M_{00}$ and $M_{01}$ according to the value of $Q$ (which are different than the subsets of item 3 above), and from the sign of $S_1(M_{01})-S_1(M_{00}) \approx \pm 1$ the value of $E_{-3}[i]$ can be deduced.

6. If $A_0[i]6=A_{-1}[i]$(i.e., $A_0[i]\_A_{-1}[i]=1$), then according to Equation 21 above $Maj(A_0[i], A_{-1}[i], A_{-2}[i])=A_{-2}[i]$, which is now the only remaining unknown term in the expression for $\Delta A_1[i] \oplus A_0[i]$, i.e., $\Delta A_1[i] \oplus A_0[i]=A_{-2}[i] \oplus Q$, where $Q$ is known. In this case, $M_1$ is split into two subsets $M_{10}$ and $M_{11}$ according to the value of $Q$ (which are different than the subsets of item 2 above), and from the sign of $S_1(M_{11})-S_1(M_{10}) \approx \pm 1$ the value of $A_{-2}[i]$ can be deduced.

If at any of the above steps if one of the values expected to be close to ±1 is instead close to 0, the corresponding hypothesis is rejected. Once the above steps are completed, if the attack is successful, one or more hypotheses will remain, one of these hypotheses corresponding with the secret initial state being sought). From that remaining hypothesis, the remaining word of the secret initial state can be determined by simple calculation. For example, $A_{-3}$ can be calculated by:

$$A_{-3}=AE_{-3}-E_{-3},$$

and $A_{-4}$ and $E_{-4}$ can then be calculated based on the already known values of $\Delta A$, $A_{-1}$, $A_{-2}$, $A_{-3}$, $\Delta E_0$, $E_{-1}$, $E_{-2}$, $E_{-3}$.

In some hash function implementations, e.g., SHA-2 hash functions, two rounds are calculated in one clock cycle. The approaches for performing a side-channel attack described herein will, with minor changes, still work on implementations where two rounds are calculated per clock cycle (e.g., presuming a target implementation has insufficient countermeasures for preventing detection of side-channel leakage). In an example of such an implementation, at clock cycle 0, two rounds, round 0 ($R_0$) and round 1 ($R_1$) are calculated, where the Hamming distance obtained at this clock cycle is $S_0^*=HD(R_0,R_2)$. That Hamming distance includes four non-constant addends and can be expressed by:

$$HD(A_0,A_{-2})+HD(E_0,E_{-2})+HD(A_1,A_{-1})+HD(E_1,E_{-1}) \quad \text{(Eq. 27)}$$

For the case of two rounds calculated per clock cycle, performing stage 1 of the attack described above with $S_0^*$ instead of $S_0$, produces a set of hypotheses regarding $\Delta A_0$, $A_{-2}$, $\Delta E_0$, $E_{-2}$. (Also, for this case, the addends corresponding to the terms $HD(A_1,A_{-1})$ and $HD(E_1,E_{-1})$ almost cancel out, as the criteria of splitting into subsets are irrelevant to them.)

For stage 2, $S_0^*$ is also used instead of $S_0$. Similar to canceling for the addends corresponding to the terms $HD(A_1,A_{-1})$ and $HD(E_1,E_{-1})$ for stage, the addends corresponding to $HD(A_0,A_{-2})$ and $HD(E_0,E_{-2})$ almost cancel at stage out for similar reasons. $A_{-1}$ and $E_{-1}$ are not known yet, but $A_{-2}$ and $E_{-2}$ are known.

For implementations calculating two rounds per clock, the order of performing each step i of stage 2 can be as follows:

1. Split the experiments into two subsets $M_0$ and $M_1$ according to the bit $E_0[i]$.
2. If $E_0[i]=0$, then according to Equation 20 above, $Ch(E_0[i], E_{-1}[i], E_{-2}[i])=E_{-2}[i]$, which is known, and the only remaining unknown term is $AE_{-3}[i]$ in the expression for $\Delta E_1[i] \oplus E_{-1}[i]=AE_{-3}[i] \oplus Q$, where $Q$ is known. In this case, $M_0$ is split into two subsets $M_{00}$ and $M_{01}$ according to the value of $Q$, and from the sign of $S_1(M_{01})-S_1(M_{00}) \approx \pm 1$ the value of $AE_{-3}[i]$ can be deduced.
3. If $E_0[i]=1$, then according to Equation 20 above, $Ch(E_0[i], E_{-1}[i], E_{-2}[i])=E_{-1}[i]$, which is now the only remaining unknown term in the expression for $\Delta E_1[i] \oplus E_{-1}[i]$, i.e., $\Delta E_1[i] \oplus E_{-1}[i]=E_{-1}[i] \oplus Q$, where $Q$ is known. In this case, $M_1$ is split into two subsets $M_{10}$ and $M_{11}$ according to the value of $Q$, and from the sign of $S_1(M_{11})-S_1(M_{10}) \approx \pm 1$ the value of $E_{-1}[i]$ can be deduced.
4. Split the experiments into two subsets $M_0$ and $M_1$ according to $A_0[i] \oplus A_{-2}[i]$ (which are different than the subsets of item 1 above).
5. If $A_0[i]=A_{-2}[i]$ (i.e., $A_0[i] \oplus A_{-2}[i]=0$), then according to Equation 21 above, $Maj(A_0[i], A_{-1}[i], A_{-2}[i])=A_{-2}[i]$, which is known, and the only remaining unknown term in the expression for $\Delta A_1[i] \oplus A_{-1}[i]$ is $E_{-3}[i]$, i.e., $\Delta A_1[i] \oplus A_{-1}[i]=E_{-3}[i] \oplus Q$, where $Q$ is known. In this case, $M_0$ is split into two subsets $M_{00}$ and $M_{01}$ according to the value of $Q$ (which are different than the subsets of item 2 above), and from the sign of $S_1(M_{01})-S_1(M_{00}) \approx \pm 1$ the value of $E_{-3}[i]$ can be deduced.
6. If $A_0[i] \neq A_{-2}[i]$ (i.e., $A_0[i] \oplus A_{-2}[i]=1$), then according to Equation 21 above, $Maj(A_0[i], A_{-1}[i], A_{-2}[i])=A_{-1}[i]$, which is now the only remaining unknown term in the expression for $\Delta A_1[i] \oplus A_{-1}[i]$, i.e., $\Delta A_1[i] \oplus A_{-1}[i]=A_{-1}[i] \oplus Q$, where $Q$ is known. In this case, $M_1$ is split into two subsets $M_{10}$ and $M_{11}$ according to the value of $Q$ (which are different than the subsets of item above), and from the sign of $S_1(M_{11})-S_1(M_{10}) \approx \pm 1$ the value of $A_{-1}[i]$ can be deduced.

Figure 7A:
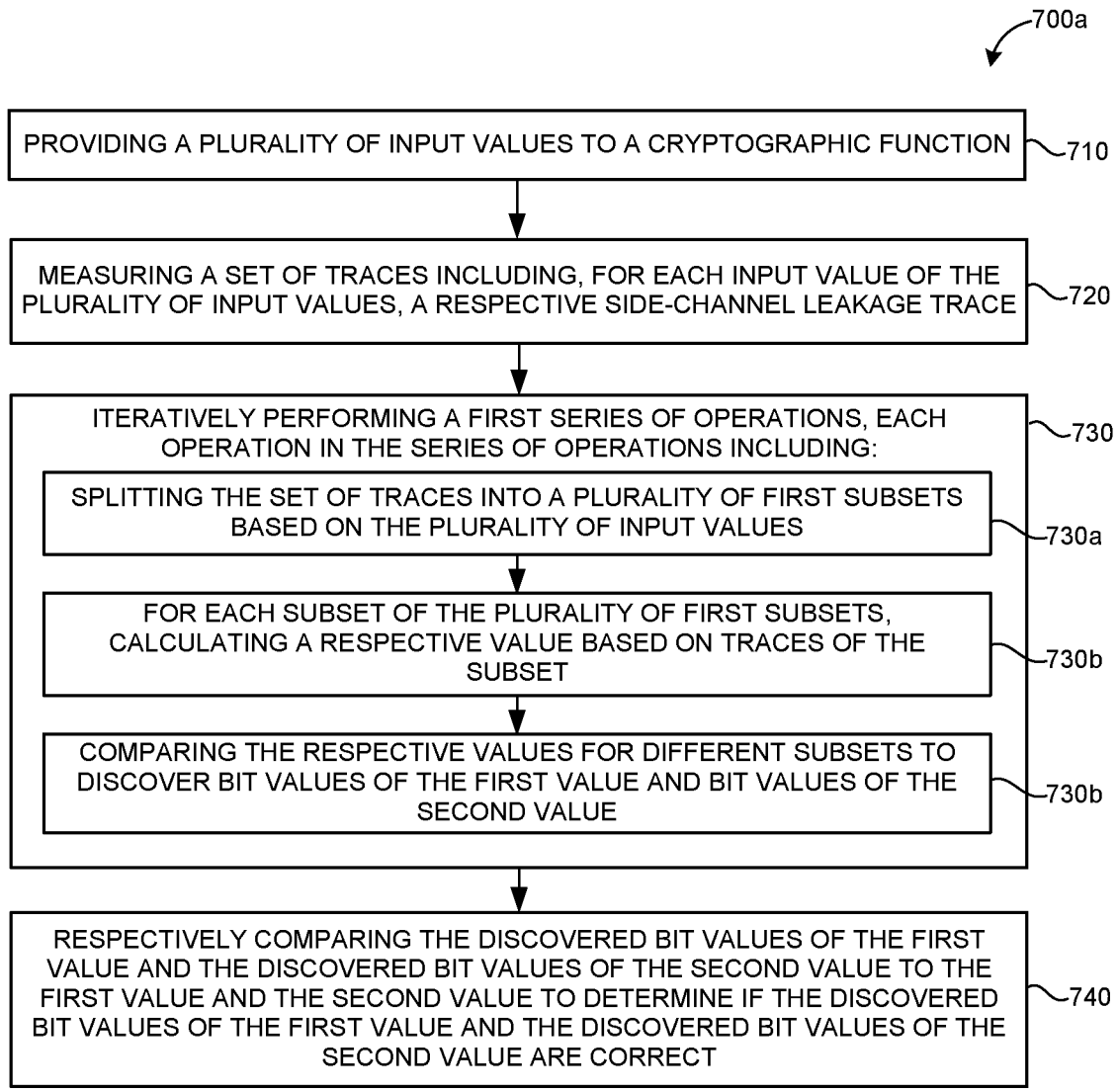
FIGS. 7A and 7B are flowcharts illustrating example methods for testing vulnerability of a cryptographic function involving multiple additions to a side-channel attack.
Figure 7B:
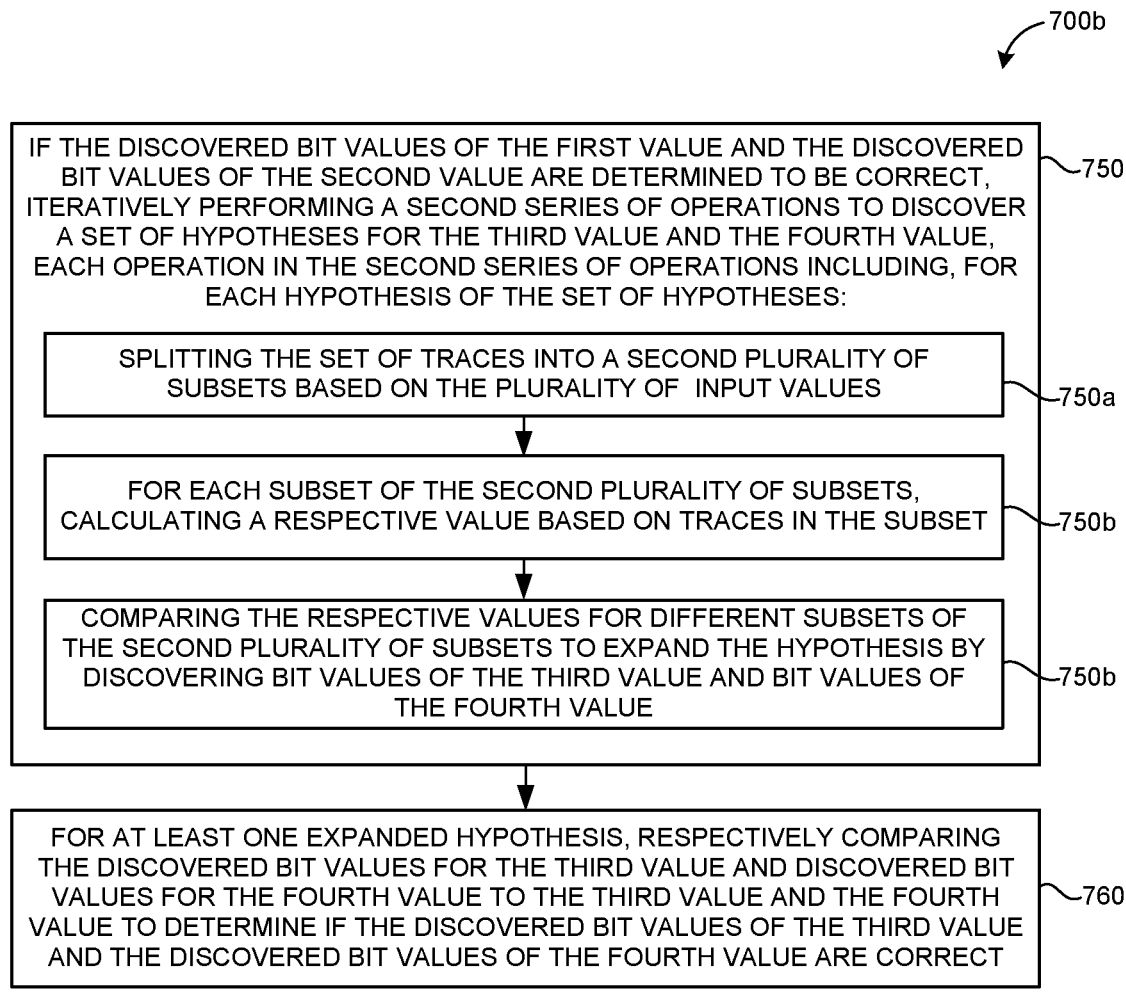

FIGS. 7A and 7B are flowcharts illustrating, respectively a method 700a and a method 700b that can be used for testing for vulnerability of a cryptographic function to a side-channel attack using approaches described herein. For instance, in example implementations, the method 700a and the method 700b can be used to test cryptographic functions involving multiple additions for vulnerability to side-channel attack.

As shown in FIG. 7A, at block 710, the method 700a includes providing a plurality of input values to a cryptographic function. In some implementations, the cryptographic function can be a hash function of the secure hash algorithm 2 (SHA-2) family of hash functions, or a HMAC cryptographic function implemented using a hash function involving multiple additions. For instance, the cryptographic function, for each input value of the plurality of input values can calculate a first sum, first sum being a sum of the input value and a first value of the cryptographic function (e.g., $\Delta A$ determined from an initial state of a SHA-2 hash function). The cryptographic function can also calculate a second sum, the second sum being a sum of the input value and a second value of the cryptographic function (e.g., $\Delta E$ determined from the initial state). The cryptographic function can replace a third value of the cryptographic function (e.g., A of the initial state) with the first sum, and replace a fourth value of the cryptographic function (e.g., E of the initial state) with the second sum.

In the example of FIG. 7A, the method 700a includes, at block, 720 measuring a set of traces including, for each input value of the plurality of input values, a respective side-channel leakage trace. Each side-channel leakage trace can include a plurality of side-channel leakage samples. In some implementations, a plurality of side-channel leakage samples for a given side channel leakage trace can include at least one of a plurality of side-channel leakage samples corresponding with a same clock cycle of the cryptographic function, or a plurality of side-channel leakage samples corresponding with different clock cycles of the cryptographic function.

At block 730, the method 710a includes iteratively performing a first series of operations, each operation in the first series of operations including the operations of block 730a, block 730b, and block 730c. At block 730a, the set of traces are split into a plurality of first subsets based on the plurality of input values. At block 730b, for each subset of the plurality of first subsets, a respective value based on traces of the subset is calculated. As discussed above with respect to block 130b of the method 100, the respective values of block 730b can be, for example, respective averages or values based on higher moments of the subsets. At block 730b, the respective values for different subsets are compared to discover bit values of the first value (e.g., ΔA in the example of SHA-2 functions) and bit values of the second value (e.g., ΔE in the example of SHA-2 functions) In the method 700a, the series of operations of block 730 discovers the bit values of the first value and the bit values of the second value from respective least significant bits (LSBs) to respective most significant bits (MSBs). At block 740, the method 700a includes respectively comparing the discovered bit values for the first value and the second value to the first value and the second value to determine if the discovered bit values of the first value and the discovered bit values of the second value are correct, where the comparison provides an assessment of the vulnerability of the cryptographic function to a side-channel attack.

In example implementations, each iteration of the series of operations of block 730 results in either no bit values being discovered, or one or more bit values of the first value and one or more bit values of the second value being discovered, such as was discussed above for stage 1. At block 730a, splitting the set of traces into the plurality of subsets can be further based on previously discovered bit values of the first value and the second value, e.g., from previous iterations. As with the method 100, the method 700a (and the method 700b) can be used to test cryptographic functions implemented in hardware or software.

The method 700b of FIG. 7B can be implemented in conjunction with the method 700a of FIG. 7A. At block 750, if the discovered bit values of the first value (e.g., ΔA for SHA-2 hash functions) and the discovered bit values of the second value (e.g., ΔE) are determined to be correct (e.g., at block 740 of the method 700a), the method 705b includes iteratively performing a second series of operations to discover a set of hypotheses for the third value (e.g., A of the initial state for SHA-2 hash functions) and the fourth value (e.g., E of the initial state).

Each operation in the second series of operations at block 750 includes, for each hypothesis of the set of hypotheses, the operations of block 750a, block 750b and block 750c. At block 750a, the set of traces are split into a second plurality of subsets based on the plurality of input values. At block 750b, for each subset of the second plurality of subsets, a respective value based on traces in the subset is calculated. The respective values of block 750b can be, for example, respective averages or values based on higher moments of the subsets of the second plurality of subsets. At block 750c, respective values for different subsets of the second plurality of subsets are compared to expand the hypothesis by discovering bit values of the third value and bit values of the fourth value. The second series of operations of block 750 discovers bit values of the third value and bit values of the fourth value from respective least significant bits (LSBs) to respective most significant bits (MSBs). At block 750b, expanding a hypothesis can includes increasing a number of hypotheses of the set of hypotheses, such as described herein.

At block 760 of the method 700b, for at least one expanded hypothesis, the discovered bit values for the third value and discovered bit values for the fourth value are respectively compared to the third value and the fourth value to determine if the discovered bit values of the third value and the discovered bit values of the fourth value are correct, where the comparison provides an assessment of the vulnerability of the cryptographic function to a side-channel attack.

Real World Considerations and Heuristics Used

As discussed above, the example approaches for mounting a CDPA attack on SHA-2 and/or HMAC-SHA-2 described herein (which can be used to test for vulnerability of SHA-2 and/or HMAC-SHA-2 implementation to side-channel analysis and attack) are based on the assumption of using the Hamming distance leakage model. With this assumption, if all pairs $(W_0, W_1)$ have been used in the experiments, then the equality of Equation 13 above, and other similar equalities are exact, and the described approaches for a CDPA, in the absence of appropriate countermeasures to prevent obtaining corresponding side-channel leakage information, will facilitate finding an initial secret state (e.g., a SHA-2 initial secret). However, such an approach is not practical as there are at $2^{64}$ possible values for pairs of $(W_0, W_1)$ in the case of SHA-256 (e.g., for pairs of two 32-bit words).

Mounting a practical attack using the approaches described herein, e.g., where only a subset of possible values of $(W_0, W_1)$ pairs are used, then the equalities will be approximate. That is, the equalities will approach the theoretical limits (e.g., the values obtained using all possible values of $(W_0, W_1)$ pairs) as the number of the experiments grows, presuming that the bits of the $(W_0, W_1)$ pairs used for the attack vectors are distributed independently and uniformly. Further, in real world devices (e.g., hardware implementations), there will be noise in addition to the Hamming distance included in side-channel leakage information. This noise can be of two types, uncorrelated noise and correlated noise.

Uncorrelated noise (e.g., thermal noise, noise related to power consumption of unrelated parts of the device, etc.) can increase a number of experiments (number of attack vectors) needed to reveal a corresponding initial secret state. However, with a sufficient number of experiments, the uncorrelated noise will eventually average to zero (or approximately zero) and does not preclude mounting a side-channel attack using the approaches disclosed herein. Conversely, correlated noise can change the rate at which experimental results approach corresponding theoretical limits, as well as change the limit which they approach, causing those limits to differ from the theoretical limits. Accordingly, in some implementations, despite increasing the number of experiments, without accounting for correlated noise, that correlated noise could preclude successfully mounting an attack using the example approaches described herein.

It is noted that when mounting a CDPA side-channel attack using the example approaches described herein, the theoretical limits are integer values. Accordingly, sufficiently small deviations of the actual limits (based on measured values) from the theoretical limits are tolerable, allowing for an initial secret state to be determined. However, if the deviations are too large, then the attack may not work without accounting for those deviations. In fact, in experiments on an FPGA board implementation, such as descried below, this deviation of actual limits from theoretical values was observed using power consumption to measure side-channel leakage. In some implementations, side-channel leakage can be measured as EM radiation in physical proximity to registers in which the secret state is held (e.g., the registers that are overwritten, which could decrease correlated noise from the combinational logic and, as a result, improve signal-to-noise ratio and reduce observed deviations from the theoretical limits.

In example implementations, measure can be taken to account or compensate for correlated noise, e.g., through the use of one or more heuristics in combination with implementation of a CDPA side-channel attacks, such as those described herein. These heuristics, which can be applied individually or in any combination, are listed below.

1. Heuristic 1 At stage 1 of a CDPA side-channel attack, such as described herein, instead of obtaining a single sample, several samples (from a same clock cycle) can be obtained. Compared with experiments conducted using simulations with just one sample per (compression function) round being obtained, in experiments on an FPGA board, such as those described herein, several samples per (compression function) round are obtain, e.g., 4 samples per round, where it is not known in advance which of the samples are best correlated with the actual Hamming distance. In some implementations, more than one of the samples can be used.

2. Heuristic 2—Samples can be obtained from several clock cycles, i.e., from several different (compression function) rounds. (As discussed herein for example implementations, $HD(A_0, A_{-1})$ is an addend in the expression for $S_r$ for $0 \leq r < 4$. Accordingly, taking samples from up to 4 consecutive clock cycles, e.g., 4 consecutive rounds, may be advantageous.)

3. Heuristic 3—For the obtained samples that are used (e.g., after determining the sample(s) best correlated with the Hamming distance), those samples can be normalized, where respective normalization parameters are determined per sample. In example implementations, values of $\partial^2 S_0(W_0)$ (e.g., for Substage 1a of Stage 1 described above), of $\Delta S_0(k)$ in Section 3.4.2 (e.g., for Substage 1b of Stage 1 described above), and of several differences between averages of Stage 2 described above, are each expected to approach some small integer as the number of traces approaches infinity (or a number of traces representing all possible values), as described herein (e.g., if the samples used are equal to the Hamming distance between consecutive states, with or without some added noise). In real world implementations, evaluation of a given sample or samples can be based on a linear dependency between the sample(s) and the Hamming distance. In order to make the comparisons with the expected small integers meaningful, the samples can be normalized. In an example implementation, such normalization can be accomplished by performing measurements with a known initial internal state, and finding a coefficient (per sample), multiplication which causes the values discussed above to be, on average, as close to the expected integers as possible. Unlike all the other heuristics, Heuristic 3 may be needed even in the absences of noise.

4. Heuristic 4—At every step of stage 1 and stage 2, calculations (e.g., for the values of $\partial^2 L(W_0)$) can be performed separately for every sample, and then averaged over the samples.

5. Heuristic 5—For case 1 of stage 1 (e.g., as described above, where the least significant bits of $\Delta A_0$ and $\Delta E_0$ match), we start from step 2 rather than step 1. Moreover, each time when subcase, 1b occurs, and the number of known bits j assumes the value i (the step counter), we proceed directly to step i+2 skipping step i+1, so that always j<i−1 rather than j i, i.e., there are always at least 8 rather than at least 4 subsets. The goal is to make the distinction clearer between subcases 1a and 1c (no non-zero values of $\partial^2 S_0(W_0)$ found vs. four non-zero values of $\partial^2 S_0(W_0)$ found).

6. Heuristic 6—In general, at every step of stage 1 and stage 2, one or more bits are determined, e.g., depending on matching between experimental average values and one of a set of possible theoretical values. At stage 1, if at any step the differences between the experimental result and all theoretical options are close enough to one of the theoretical values, e.g., the difference is less than a certain threshold, it can be considered as matching. However, if all the differences are greater than this threshold, all options can be taken into account. If after several steps, a number of options exceeds (another) threshold, the options with the respective highest scores are dropped, where the respective scores are calculated as a sum of the deviations from the theoretical values at all the steps.

7. Heuristic 7—At stage 3 of an example CDPA side-channel attack, as described herein, instead of simply comparing measured leakage against the expected Hamming distance, which may not work due to noise, a correlation between the measured leakage and the expected Hamming distance at several first rounds can be calculated. For incorrect hypotheses the correlation rapidly decreases towards the noise level, while for a correct hypothesis the correlation remains significant.

Experimental Results

Viability of the disclosed approaches for mounting a successful CDPA side-channel attack (e.g., on SHA-2 and/or HMAC-SHA-2) implementations have been evaluated experimentally. These experimental evaluations include software simulation (in the Hamming distance model of side-channel leakage), and on a FPGA board (using the heuristics described above. The following is a discussion of the methodology of the experimental evaluations and the results of example experiments. In these experiments, a SHA-256 hash function was evaluated.

Figure 8:
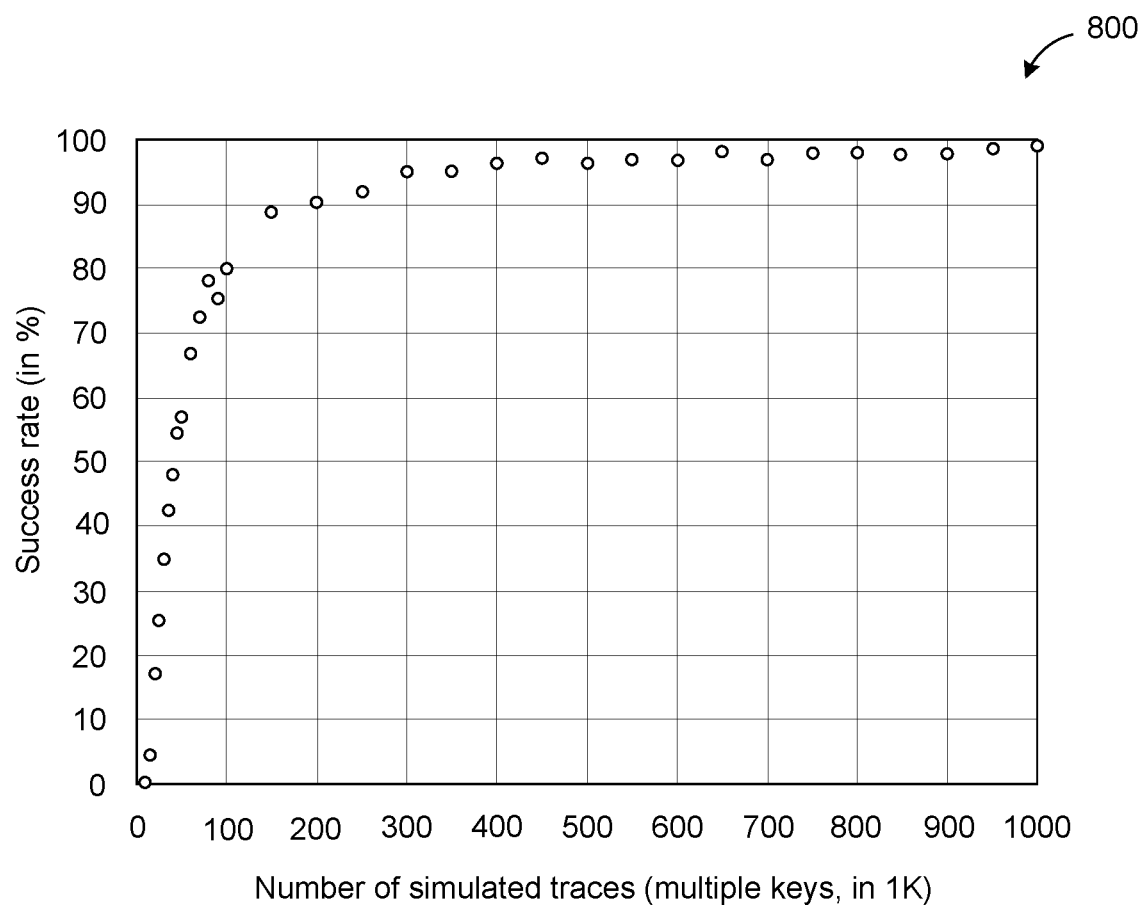
FIG. 8 is a graph illustrating example experimental results.

In the simulated experiments, that hash function implementation was simulated in software using the Hamming distance model without noise (correlated or uncorrelated). The software simulation was used to generate attack traces (traces), and experiments with different amounts of traces were performed, e.g., from 10K to 50K traces with a 5K step, and from 50K to 1M traces with a 50K step. For each amount of traces, 1000 experiments were performed with different randomly chosen respective secret initial states. For stage 1 (as described herein) the entire amount of traces was used each time. For experiments where a total amount of traces was greater than 20K, only the first 20K traces were used for stage (as described herein), as it was noted that even in this case of using 20K traces, the errors at this stage were extremely rare. The results of this experiment are illustrated by a graph 800 in FIG. 8 (with data points shown as open circles). In FIG. 8, a number of traces is represented on the x-axis of the graph 800 and success rate probability (e.g., of discovering the secret initial state) is represented on the y-axis of the graph 800.

As shown in FIG. 8, probability of success is 4.6% for 15K traces and rapidly increases as the number of traces increases, reaching 90% at 200K traces and 99% at 1M traces. As described herein, matching bit sequences in $\Delta A_0$ and $\Delta E_0$ significantly increases the number of traces used for a successful attach. For instance, 1M traces was shown to not be sufficient to determine the initial secret state for approximately 1% of the experimental cases.

Figure 9:
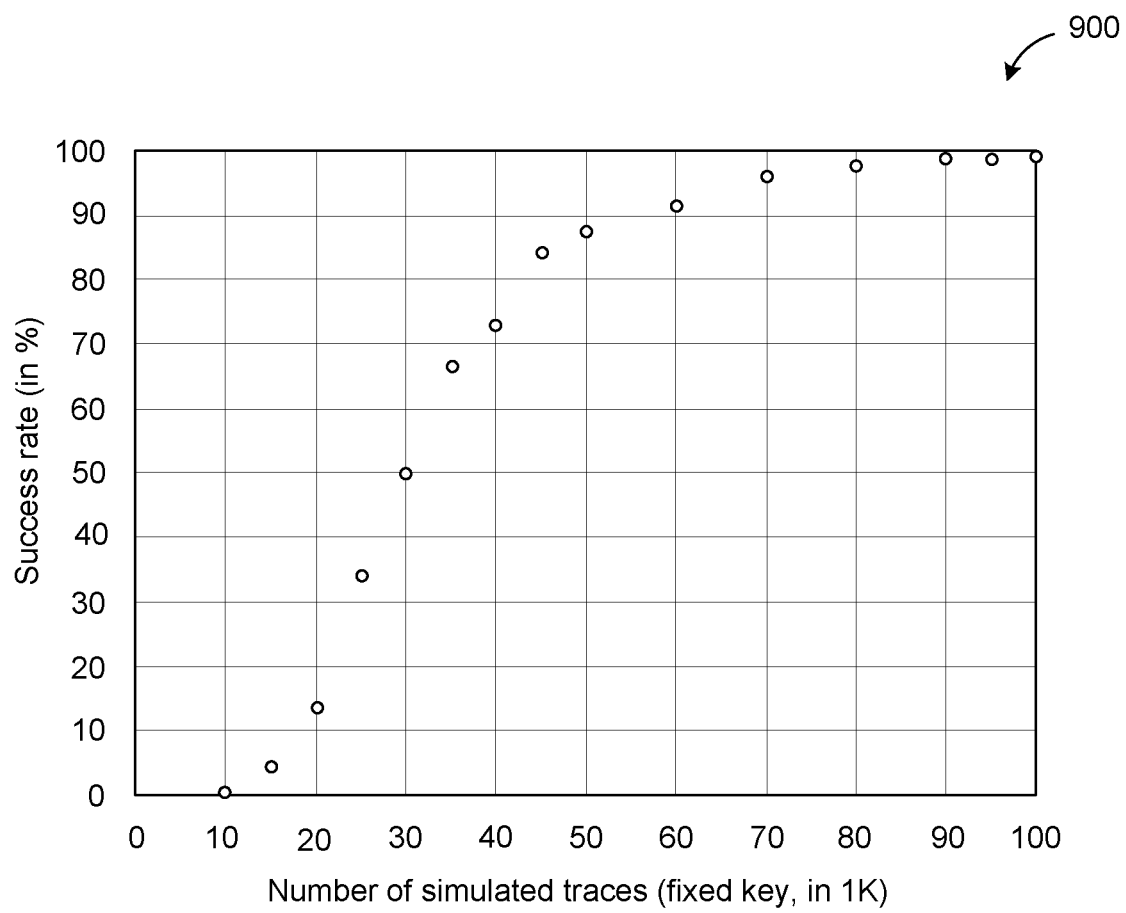
FIG. 9 is a graph illustrating further example experimental results.

In addition to the simulation experiments illustrated in FIG. 8, simulated experiments (without noise) were for a single key, e.g., the same key used in the FPGA board experiments described below. For this single key simulation experiment, a success rate of from 4.1% on 15K traces was observed, with the success fate reaching approximately 100% on 130K traces. The results of this experiment are illustrated by a graph 900 in FIG. 9. As with FIG. 8, a number of traces is represented on the x-axis of the graph 900 and success rate probability (e.g., of discovering the secret initial state) is represented on the y-axis of the graph 900.

An FGPA experiment was performed as follows. Resistor-transistor-logic (RTL) for a low-area SHA-256 hash function implementations was synthesized for a CW305 Artix FPGA target board by NewAE Technology Inc. with a Keysight Technologies E36100B Series DC Power Supply for power stabilization. Traces were collected using the NewAE Technology ChipWhisperer-Lite® kit with four samples per clock cycle. Power supply signal information was obtained by measuring current via a shunt resistor connected serially to the FPGA supply line.

The experiment on the FPGA board included:
1. Generating 1M traces for a single secret initial state and bit-wise uniformly and independently distributing input data.
2. Selecting 100 random subsets of a fixed size.
3. Performing a CDPA attack using the disclosed approaches based on each of the subsets.
4. Counting the success rate.
5. Repeating steps 2-4 for subset sizes from 25K to 50K with a 5K step, and from 50K to 300K with a 25K step.

Figure 10:
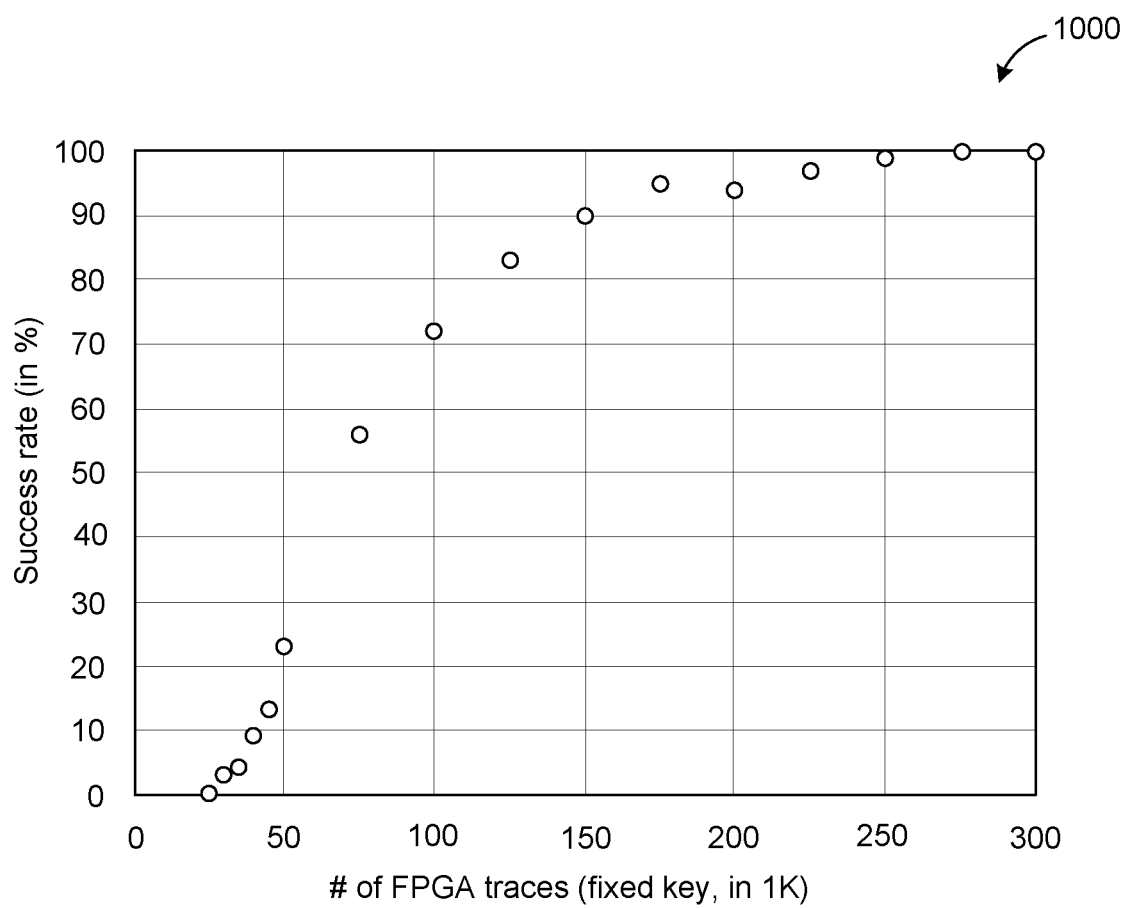
FIG. 10 is a graph illustrating still further example experimental results.

The results of the FPGA board experiment are illustrated by a graph 1000 in FIG. 10. As with FIGS. 8 and 9, a number of traces is represented on the x-axis of the graph 1000 and success rate probability (e.g., of discovering the secret initial state) is represented on the y-axis of the graph 1000. As shown in FIG. 10, with 30K traces a 3% success rate was observed. As further shown in FIG. 10, with 275K and 300K traces, 100 out of 100 attack attempts were successful.

Implementations of the various techniques described herein may be implemented in digital electronic circuitry, or in computer hardware, firmware, software, or in combinations of them. Implementations may be implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method for testing for vulnerability of a cryptographic function to a side-channel attack, the method comprising:
providing a plurality of input values to the cryptographic function, wherein the cryptographic function, for each input value of the plurality of input values:
calculates a sum of the input value and a first value of the cryptographic function; and
replaces a second value of the cryptographic function with the sum;
measuring a set of samples including, for each input value of the plurality of input values, a respective side-channel leakage sample; and
iteratively performing a series of operations including:
splitting the set of samples into a plurality of subsets based on the plurality of input values;
for each subset of the plurality of subsets, calculating a respective value based on samples of the subset; and
comparing the respective values for different subsets to discover bit values of the first value and bit values of the second value,
the bit values of the first value and the bit values of the second value being discovered from respective least significant bits (LSBs) to respective most significant bits (MSBs).

2. The method of claim 1, further comprising respectively comparing the discovered bit values of the first value and the discovered bit values of the second value to the first value and the second value to determine if the discovered bit values of the first value and the discovered bit values of the second value are correct.

3. The method of claim 1, wherein each iteration of the series of operations discovers one or more bit values of the first value and one or more bit values of the second value.

4. The method of claim 1, wherein splitting the set of samples into the plurality of subsets is further based on previously discovered bit values of the first value and the second value.

5. The method of claim 1, wherein the respective values for the different subsets are respective averages.

6. The method of claim 1, wherein the cryptographic function is implemented in hardware.

7. A method for testing for vulnerability of a cryptographic function to a side-channel attack, the method comprising:
providing a plurality of input values to the cryptographic function, wherein the cryptographic function, for each input value of the plurality of input values:
calculates a first sum, the first sum being a sum of the input value and a first value of the cryptographic function;
calculates a second sum, the second sum being a sum of the input value and a second value of the cryptographic function;
replaces a third value of the cryptographic function with the first sum; and
replaces a fourth value of the cryptographic function with the second sum;
measuring a set of traces including, for each input value of the plurality of input values, a respective side-channel leakage trace;
iteratively performing a series of operations, each operation in the series of operations including:
splitting the set of traces into a plurality of subsets based on the plurality of input values;
for each subset of the plurality of subsets, calculating a respective value based on traces of the subset; and
comparing the respective values for different subsets to discover bit values of the first value and bit values of the second value,
the series of operations discovering the bit values of the first value and the bit values of the second value from respective least significant bits (LSBs) to respective most significant bits (MSBs); and
respectively comparing the discovered bit values for the first value and the second value to the first value and the second value to determine if the discovered bit values of the first value and the discovered bit values of the second value are correct.

8. The method of claim 7, wherein each iteration of the series of operations results in one of:
no bit values being discovered; or
one or more bit values of the first value and one or more bit values of the second value being discovered.

9. The method of claim 7, wherein splitting the set of traces into the plurality of subsets is further based on previously discovered bit values of the first value and the second value.

10. The method of claim 7, wherein the respective values for the different subsets are respective averages.

11. The method of claim 7, wherein the cryptographic function is implemented in hardware.

12. The method of claim 7, wherein the cryptographic function is a secure hash algorithm 2 (SHA-2) hash function.

13. The method of claim 7, wherein the cryptographic function is a hash-based message authentication code (HMAC) function.

14. The method of claim 7, wherein each respective side-channel leakage trace includes a plurality of side-channel leakage samples.

15. The method of claim 14, wherein the plurality of side-channel leakage samples includes at least one of:
a plurality of side-channel leakage samples corresponding with a same clock cycle of the cryptographic function; or
a plurality of side-channel leakage samples corresponding with different clock cycles of the cryptographic function.

16. The method of claim 7, wherein the plurality of subsets is a first plurality of subsets and the series of operations is a first series of operations, the method further comprising:
if the discovered bit values of the first value and the discovered bit values of the second value are determined to be correct, iteratively performing a second series of operations to discover a set of hypotheses for the third value and the fourth value, each operation in the second series of operations including, for each hypothesis of the set of hypotheses:
splitting the set of traces into a second plurality of subsets based on the plurality of input values;
for each subset of the second plurality of subsets, calculating a respective value based on traces in the subset; and comparing the respective values for different subsets of the second plurality of subsets to expand the hypothesis by discovering bit values of the third value and bit values of the fourth value, the second series of operations discovering the bit values of the third value and the bit values of the fourth value from respective least significant bits (LSBs) to respective most significant bits (MSBs); and for at least one expanded hypothesis, respectively comparing the discovered bit values for the third value and discovered bit values for the fourth value to the third value and the fourth value to determine if the discovered bit values of the third value and the discovered bit values of the fourth value are correct.

17. The method of claim 16, wherein expanding the hypothesis includes increasing a number of hypotheses of the set of hypotheses.

18. The method of claim 16, wherein the cryptographic function is a secure hash algorithm 2 (SHA-2) hash function.

19. The method of claim 16, wherein the cryptographic function is a hash-based message authentication code (HMAC) function.

20. A non-transitory computer-readable medium having instructions stored thereon, the instructions, when executed by one or more processors cause the one or more processors to:

provide a plurality of input values to a cryptographic function, wherein the cryptographic function, for each input value of the plurality of input values:
calculates a sum of the input value and a first value of the cryptographic function; and
replaces a second value of the cryptographic function with the sum;

measure a set of samples including, for each input value of the plurality of input values, a respective side-channel leakage sample; and iteratively perform a series of operations including:
splitting the set of samples into a plurality of subsets based on the plurality of input values;
for each subset of the plurality of subsets, calculating a respective value based on samples of the subset; and
comparing the respective values for different subsets to discover bit values of the first value and bit values of the second value, the bit values of the first value and the bit values of the second value being discovered from respective least significant bits (LSBs) to respective most significant bits (MSBs).

21. A non-transitory computer-readable medium having instructions stored thereon, the instructions, when executed by one or more processors cause the one or more processors to:

provide a plurality of input values to a cryptographic function, wherein the cryptographic function, for each input value of the plurality of input values:
calculates a first sum, the first sum being a sum of the input value and a first value of the cryptographic function;
calculates a second sum, the second sum being a sum of the input value and a second value of the cryptographic function;
replaces a third value of the cryptographic function with the first sum; and
replaces a fourth value of the cryptographic function with the second sum;

measure a set of traces including, for each input value of the plurality of input values, a respective side-channel leakage trace;

iteratively perform a series of operations, each operation in the series of operations including:
splitting the set of traces into a plurality of subsets based on the plurality of input values;
for each subset of the plurality of subsets, calculating a respective value based on traces of the subset; and
comparing the respective values for different subsets to discover bit values of the first value and bit values of the second value, the series of operations discovering the bit values of the first value and the bit values of the second value from respective least significant bits (LSBs) to respective most significant bits (MSBs); and respectively compare the discovered bit values for the first value and the second value to the first value and the second value to determine if the discovered bit values of the first value and the discovered bit values of the second value are correct.

22. The non-transitory computer-readable medium of claim 21, wherein the plurality of subsets is a first plurality of subsets and the series of operations is a first series of operations, and the instructions, when executed by the one or more processors, further cause the one or more processors to:

if the discovered bit values of the first value and the discovered bit values of the second value are determined to be correct, iteratively perform a second series of operations to discover a set of hypotheses for the third value and the fourth value, each operation in the second series of operations including, for each hypothesis of the set of hypotheses:
splitting the set of traces into a second plurality of subsets based on the plurality of input values;
for each subset of the second plurality of subsets, calculating a respective value based on traces in the subset;
comparing the respective values for different subsets of the second plurality of subsets to expand the hypothesis by discovering bit values of the third value and bit values of the fourth value, the second series of operations discovering the bit values of the third value and the bit values of the fourth value from respective least significant bits (LSBs) to respective most significant bits (MSBs); and for at least one expanded hypothesis, respectively compare the discovered bit values for the third value and discovered bit values for the fourth value to the third value and the fourth value to determine if the discovered bit values of the third value and the discovered bit values of the fourth value are correct.

\* \* \* \* \*